United States Patent
Kim et al.

(10) Patent No.: US 12,019,352 B2
(45) Date of Patent: Jun. 25, 2024

(54) COMPOSITION, ELECTRO-OPTIC MATERIAL, AND METHOD FOR PREPARING ELECTRO-OPTIC MATERIAL

(71) Applicant: SAMSUNG ELECTRONICS CO., LTD., Suwon-si (KR)

(72) Inventors: Min Sang Kim, Anseong-si (KR); Yoon Seok Ko, Suwon-si (KR); Boreum Jeong, Sejong-si (KR); Sang Soo Jee, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 782 days.

(21) Appl. No.: 17/024,960

(22) Filed: Sep. 18, 2020

(65) Prior Publication Data
US 2021/0088872 A1 Mar. 25, 2021

(30) Foreign Application Priority Data
Sep. 24, 2019 (KR) .......................... 10-2019-0117612

(51) Int. Cl.
| | | |
|---|---|---|
| *C08F 220/14* | (2006.01) | |
| *C08G 77/14* | (2006.01) | |
| *C08G 77/26* | (2006.01) | |
| *C08K 5/23* | (2006.01) | |
| *C08L 33/10* | (2006.01) | |
| *G02F 1/1516* | (2019.01) | |
| *G02F 1/361* | (2006.01) | |
| *C08L 43/04* | (2006.01) | |

(52) U.S. Cl.
CPC .......... *G02F 1/3619* (2013.01); *C08F 220/14* (2013.01); *C08G 77/14* (2013.01); *C08G 77/26* (2013.01); *C08K 5/23* (2013.01); *C08L 33/10* (2013.01); *G02F 1/15165* (2019.01); *G02F 1/3612* (2013.01); *C08L 43/04* (2013.01); *G02F 2202/022* (2013.01); *G02F 2202/38* (2013.01)

(58) Field of Classification Search
CPC ........ C08F 220/14; C08L 33/10; C08L 83/04; C08L 43/04
See application file for complete search history.

(56) References Cited

U.S. PATENT DOCUMENTS

| | | | | |
|---|---|---|---|---|
| 3,503,087 A | * | 3/1970 | Ruettiger | ................ C09B 69/10 |
| | | | | 8/557 |
| 4,948,843 A | * | 8/1990 | Roberts | ...................... C08F 8/42 |
| | | | | 525/353 |
| 5,433,895 A | * | 7/1995 | Jeng | ....................... G02F 1/3555 |
| | | | | 252/582 |

FOREIGN PATENT DOCUMENTS

CN 101117369 A 2/2008

OTHER PUBLICATIONS

Lujian Chen, et al., Dipolar orientation stabilities of hybrid films for second-order nonlinear optical applications, Journal of Sol-Gel Science and Technology, (2007) 43:329-335.

* cited by examiner

*Primary Examiner* — Margaret G Moore
(74) *Attorney, Agent, or Firm* — CANTOR COLBURN LLP

(57) ABSTRACT

A composition for preparing a nonlinear optic material including an organic chromophore that is polarized by an electric field, a precursor that can form an inorganic material polymer by a sol-gel reaction, and a compatibilizer that can bind to both the organic chromophore and the inorganic material polymer, wherein the organic chromophore includes a functional group at a terminal end that can bind to both the inorganic material polymer and the compatibilizer, a nonlinear optic material prepared from the composition, a method of preparing the nonlinear optic material, and an electro-optic device including the nonlinear optic material are disclosed.

17 Claims, 4 Drawing Sheets

Example 1 
Example 2 
Example 3

COMPOSITION, ELECTRO-OPTIC MATERIAL, AND METHOD FOR PREPARING ELECTRO-OPTIC MATERIAL

CROSS-REFERENCE TO RELATED APPLICATION

This application claims priority to Korean Patent Application No. 10-2019-0117612 filed in the Korean Intellectual Property Office on Sep. 24, 2019, and all the benefits accruing therefrom under 35 U.S.C. § 119, the content of which in its entirety is herein incorporated by reference.

BACKGROUND

1. Field

A composition, an electro-optic material, and a method for preparing an electro-optic material are disclosed.

2. Description of the Related Art

Recently, electronic circuits as a means of information transfer and storage are limited in their processing speed or storage capacity, and new technology for enhancing such functions of electronic circuits is needed. Particular attention of next generation circuits is being directed to optic circuits that use light. When light is used as an information transmission medium, it is possible to process information at greater speed and with greater storage capacity than conventional circuits using electrons due to the high speed, broadband, and parallelism characteristics of light. Various electro-optic devices that use light may function using nonlinear optic effects of compounds. As light passes through a medium that exhibits nonlinear optic properties (NLO), it is possible to change phases, amplitudes, and refractive indices, and when these effects are used properly, the electro-optic devices have great potential for use in optical signal processing, photosensors, optic communications, and the like.

An inorganic crystal material such as lithium niobate ($LiNbO_3$) may be used as the nonlinear optic material, but the inorganic crystal is expensive due to technical difficulties with the device production process. Accordingly, attention has been paid to organic nonlinear optic materials, which may exhibit improved workability and may be manufactured at lower cost. The organic nonlinear optic material has a lower dielectric constant than an inorganic material, has a particularly good nonlinear optic property, has a faster switching speed than lithium niobate semiconductor material (50 picoseconds vs. 2 nanoseconds) and a wider bandwidth than lithium niobate semiconductor material. An organic optoelectronic material may be used to connect fiber arrays and has a merit with good workability, that is, an organic optoelectronic material may have many advantageous benefits as a material in an electro-optic device.

Although an organic optoelectronic material may exhibit the above technical merits or benefits, and the electro-optic device manufactured therefrom is superior in characteristics to the electro-optic device using an inorganic material, there are many technical issues in the manufacture of the electro-optic device using an organic optic material. To minimize these manufacturing issues several methods have been attempted and reported.

SUMMARY

An embodiment provides a composition for preparing a nonlinear optic material including an organic chromophore.

Another embodiment provides a method for preparing a nonlinear optic material without the need for a poling process step when using the composition.

Another embodiment provides a nonlinear optic material that may be prepared from the composition or prepared according to a method described herein.

A composition for preparing a nonlinear optic material according to an embodiment includes (i) an organic chromophore that is polarized by an electric field, (ii) a precursor that can form an inorganic material polymer by a sol-gel reaction, and (iii) a compatibilizer that can bind to both the organic chromophore and the inorganic material polymer, wherein the organic chromophore includes a functional group at a terminal end that can bind to both the inorganic material polymer and the compatibilizer.

The organic chromophore may include at least one of chromophore functional groups represented by Formulae 1-1 to 1-8:

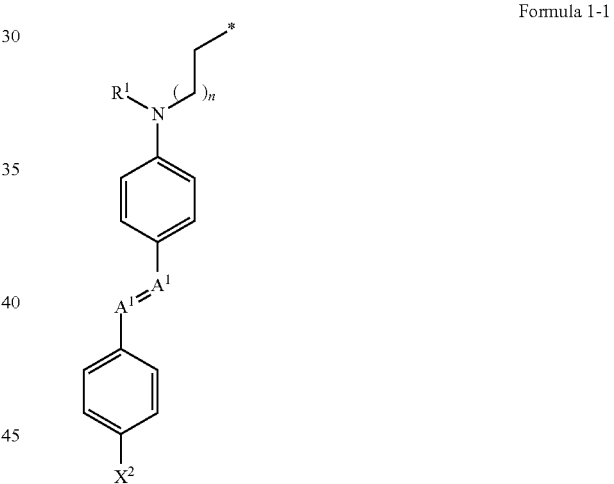

Formula 1-1

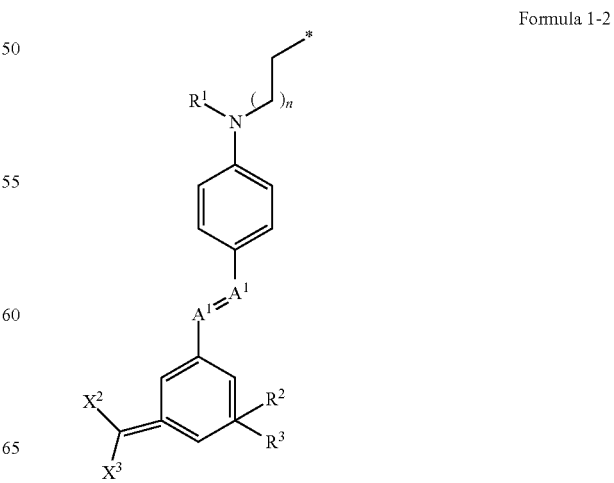

Formula 1-2

Formula 1-3

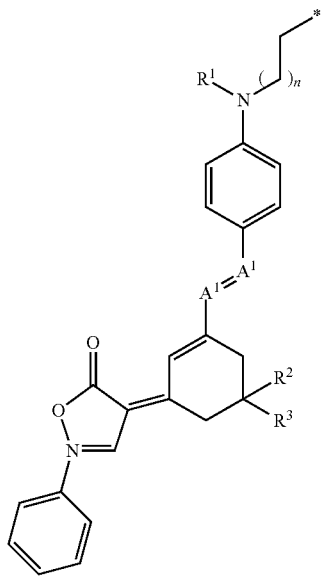

Formula 1-4

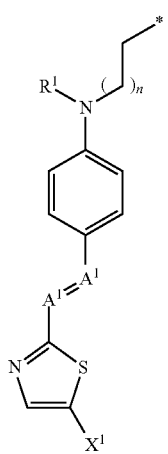

Formula 1-5

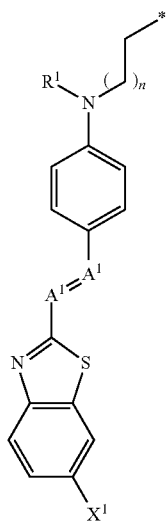

Formula 1-6

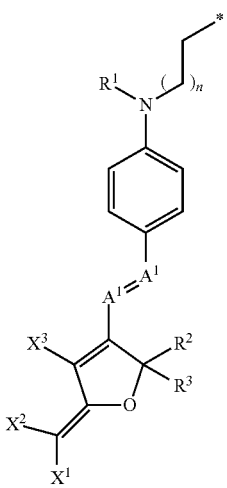

Formula 1-7

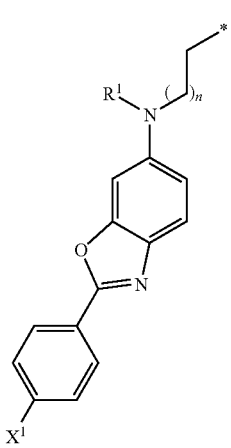

Formula 1-8

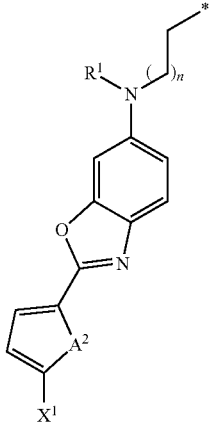

In Chemical Formulae 1-1 to 1-8, $R^1$, $R^2$, and $R^3$ are independently hydrogen, a substituted or unsubstituted C1 to C10 alkyl group, a substituted or unsubstituted C3 to C10 cycloalkyl group, a substituted or unsubstituted C6 to C30 aryl group, or a combination thereof, $A^1$ is independently CH or N, $X^1$, $X^2$, and $X^3$ are independently a $-NO_2$, $-CN$, $-C(CN)=C(CN_2)$, $R-(C=O)O-$ (wherein R is a substituted or unsubstituted C1 to C10 alkyl group, or a substituted or unsubstituted C6 to C30 aryl group), a halogen element, a haloalkyl group, or a C1 to C10 alkyl group that is unsubstituted or substituted with a sulfone group (—SO$_2$), n is an integer from 1 to 11, and

* represents a linking point where the organic chromophore is linked to the functional group that can bind to both the inorganic material polymer and the compatibilizer. In an embodiment, the organic chromophore is linked to a functional group that can bind to all of the precursor of the inorganic material polymer, the inorganic material polymer, and the compatibilizer.

The organic chromophore may be represented by at least one of Chemical Formulae 1-1, 1-4, and 1-5. In Chemical Formulae 1-1, 1-4, and 1-5, $X^1$ and $X^2$ may independently be —NO$_2$, —CN, a halogen element, a haloalkyl group, or a C1 to C10 alkyl group that is unsubstituted or substituted with a sulfone group (—SO$_2$), $A^1$ may be N, and $R^1$ may be a substituted or unsubstituted C1 to C10 alkyl group.

The precursor that can form the inorganic material polymer by the sol-gel reaction may be represented by Chemical Formula 2:

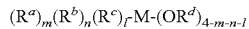   Chemical Formula 2

In Chemical Formula 2, $R^a$, $R^b$, $R^c$, and $R^d$ are independently hydrogen, a substituted or unsubstituted C1 to C30 alkyl group, a substituted or unsubstituted C2 to C30 alkenyl group, or a substituted or unsubstituted C2 to C30 alkynyl group having at least one double bond or triple bond, respectively, a substituted or unsubstituted C3 to C30 cycloalkyl group, or a substituted or unsubstituted C6 to C30 aryl group, m, n, and l are independently an integer of 0 or 1 and 0≤m+n+l≤2, and M is Si, Ti, Al, Hf, Sn, Zr, Ga, Ge, In, or Sb.

M of Chemical Formula 2 may be Si, Ti, or Al, and 0≤m+n+l≤1.

The compatibilizer that is capable of being bound to, or can bind to, both the organic chromophore and the inorganic material polymer may be a polymer including a functional group represented by Chemical Formula 3, that is present in a side chain.

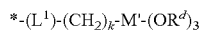   Chemical Formula 3

In Chemical Formula 3, $L^1$ is a single bond, —(C=O)O—, —O—, —S—, —SO$_2$—, —NR$^e$R$^f$—, —(C=O)NR$^g$—, —O(C=O)NR$^h$— (wherein R$^e$ to R$^h$ are independently hydrogen, a substituted or unsubstituted C1 to C30 alkyl group, a substituted or unsubstituted C3 to C30 cycloalkyl group, or a substituted or unsubstituted C6 to C30 aryl group), or a combination thereof, M' is Si, Ti, Al, Hf, Sn, Zr, Ga, or Ge, $R^d$ is hydrogen, a substituted or unsubstituted C1 to C30 alkyl group, a substituted or unsubstituted C2 to C30 alkenyl group, or a substituted or unsubstituted C2 to C30 alkynyl group having at least one double bond or triple bond, respectively, a substituted or unsubstituted C3 to C30 cycloalkyl group, or a substituted or unsubstituted C6 to C30 aryl group, k is an integer of 0 to 30, and

* represents a linking point with the side chain of the compatibilizer polymer.

The polymer including the functional group represented by Chemical Formula 3 in the side chain may include poly(meth)acrylate, polyvinyl, polyalcohol, polyimide, polyamide, polyester, polyurethane, or a combination thereof.

The compatibilizer may include the functional group represented by Chemical Formula 3 in an amount of less than or equal to about 50 mole percent (mol %) based on the total moles of all structural units of the polymer of the compatibilizer.

The compatibilizer may be a polymer including a structural unit represented by Chemical Formula 4-1 or a structural unit represented by Chemical Formula 4-2. Alternatively, the compatibilizer may be a polymer including a structural unit represented by Chemical Formula 4-1 and a structural unit represented by Chemical Formula 4-2:

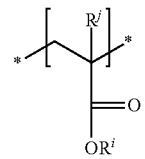   Chemical Formula 4-1

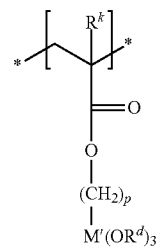   Chemical Formula 4-2

In Chemical Formulae 4-1 and 4-2, $R^d$, $R^i$, $R^j$, and $R^k$ are independently hydrogen, a substituted or unsubstituted C1 to C30 alkyl group, a substituted or unsubstituted C2 to C30 alkenyl group, or a substituted or unsubstituted C2 to C30 alkynyl group having at least one double bond or triple bond, respectively, a substituted or unsubstituted C3 to C30 cycloalkyl group, or a substituted or unsubstituted C6 to C30 aryl group, M' is Si, Ti, Al, Hf, Sn, Zr, Ga, or Ge, p is an integer of 0 to 10, and

* represents a linking point with an adjacent structural unit.

The functional group at a terminal end of the organic chromophore, and which is capable of being bound to both the inorganic material polymer and the compatibilizer, may be represented by Chemical Formula 3:

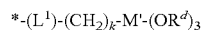   Chemical Formula 3

In Chemical Formula 3, $L^1$ is a single bond, —(C=O)O—, —O—, —S—, —SO$_2$—, —NR$^e$R$^f$—, —(C=O)NR$^g$—, —O(C=O)NR$^h$— (wherein R$^e$, R$^f$, R$^g$, and R$^h$ are independently hydrogen, a substituted or unsubstituted C1 to C30 alkyl group, a substituted or unsubstituted C3 to C30 cycloalkyl group, or a substituted or unsubstituted C6 to C30 aryl group), or a combination thereof, M' is Si, Ti, Al, Hf, Sn, Zr, Ga, or Ge, $R^d$ is hydrogen, a substituted or unsubstituted C1 to C30 alkyl group, a substituted or unsubstituted C2 to C30 alkenyl group, or a substituted or unsubstituted C2 to C30 alkynyl group having at least one double bond or triple bond, respectfully, a substituted or unsubstituted C3 to C30 cycloalkyl group, or a substituted or unsubstituted C6 to C30 aryl group, k is an integer of 0 to 30, and

* represents a linking point with the terminal end of the organic chromophore.

The functional group represented by Chemical Formula 3 may be represented by Chemical Formula 5:

    Chemical Formula 5

*—O(C=O)NR$^i$—(CH$_2$)$_k$-M'-(OR$^d$)$_3$

In Chemical Formula 5,

R$^i$ is hydrogen, a substituted or unsubstituted C1 to C30 alkyl group, a substituted or unsubstituted C3 to C30 cycloalkyl group, or a substituted or unsubstituted C6 to C30 aryl group, M' is Si, Ti, or Al, R$^d$ is a substituted or unsubstituted C1 to C10 alkyl group, k is an integer of 1 to 10, and

* represents a linking point with the terminal end of the organic chromophore.

The organic chromophore in the composition may be included in an amount of less than or equal to about 30 weight percent based on a total weight of the organic chromophore, the precursor of the inorganic material polymer, and the compatibilizer.

The organic chromophore in the composition may be included in an amount of greater than or equal to about 1 weight percent and less than or equal to about 25 weight percent based on a total weight of the organic chromophore, the precursor of the inorganic material polymer, and the compatibilizer.

The precursor of the inorganic material polymer and the compatibilizer in the composition may be present in a mole ratio of about 9.9:0.1 to about 2:8.

The composition may further include a solvent.

A method of preparing the nonlinear optic material according to another embodiment includes preparing a composition including (i) an organic chromophore including a functional group represented by Chemical Formula 3 at a terminal end, and which can be polarized by an electric field, (ii) a precursor to an inorganic material polymer that is formed by a sol-gel reaction, and (iii) a compatibilizer that is a polymer including a functional group represented by Chemical Formula 3 in the side chain:

*-(L$^1$)-(CH$_2$)$_k$-M'-(OR$^d$)$_3$    Chemical Formula 3 wherein in Chemical Formula 3,

L$^1$ is a single bond, —(C=O)O—, —O—, —S—, —SO$_2$—, —NR$^e$R$^f$—, —(C=O)NR$^g$—, —O(C=O)NR$^h$— (wherein R$^e$, R$^f$, R$^g$, and R$^h$ are independently hydrogen, a substituted or unsubstituted C1 to C30 alkyl group, a substituted or unsubstituted C3 to C30 cycloalkyl group, or a substituted or unsubstituted C6 to C30 aryl group), or a combination thereof, M' is Si, Ti, Al, Hf, Sn, Zr, Ga, or Ge, R$^d$ is hydrogen, a substituted or unsubstituted C1 to C30 alkyl group, a substituted or unsubstituted C2 to C30 alkenyl group, or a substituted or unsubstituted C2 to C30 alkynyl group having at least one double bond or triple bond, respectively, a substituted or unsubstituted C3 to C30 cycloalkyl group, or a substituted or unsubstituted C6 to C30 aryl group, k is an integer of 0 to 30, and

* represents a linking point with the terminal end of the organic chromophore or the side chain of the polymer of the compatibilizer;

coating the composition on a substrate; and heating the coating such that the precursor of the inorganic material polymer forms a polymer by a sol-gel reaction.

The method of preparing the nonlinear optic material may not include a poling process after forming the polymer by the sol-gel reaction.

The precursor forming the inorganic material polymer by the sol-gel reaction may be represented by Chemical Formula 2:

    (Chemical Formula 2)

(R$^a$)$_m$(R$^b$)$_n$(R$^c$)$_l$-M-(OR$^d$)$_{4-m-n-l}$

In Chemical Formula 2,

R$^a$, R$^b$, R$^b$, and R$^d$ are independently hydrogen, a substituted or unsubstituted C1 to C30 alkyl group, a substituted or unsubstituted C2 to C30 alkenyl group, or a substituted or unsubstituted C2 to C30 alkynyl group having at least one double bond or triple bond, respectively, a substituted or unsubstituted C3 to C30 cycloalkyl group, or a substituted or unsubstituted C6 to C30 aryl group, m, n, and l are independently an integer of 0 or 1, provided that m+n+l and M is Si, Ti, Al, Hf, Sn, Zr, Ga, Ge, In, or Sb.

The organic chromophore may include at least one of chromophore functional groups represented by Chemical Formulae 1-1 to 1-8:

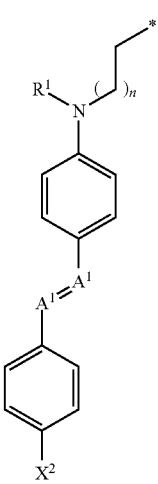

Formula 1-1

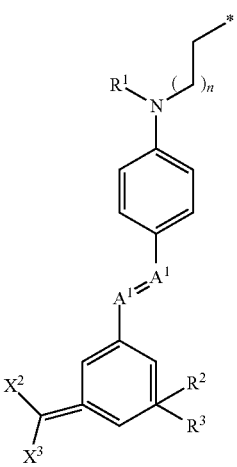

Formula 1-2

Formula 1-3

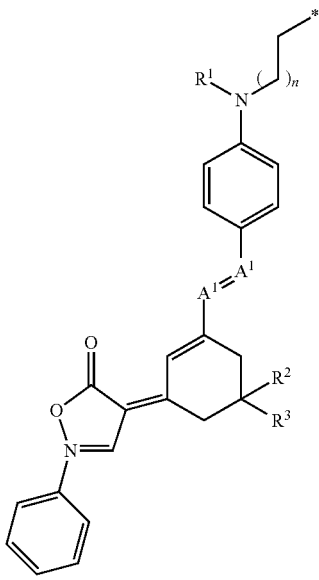

Formula 1-4

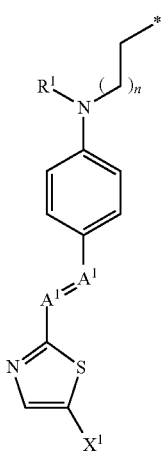

Formula 1-5

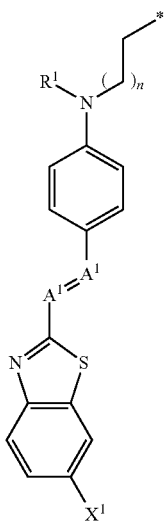

Formula 1-6

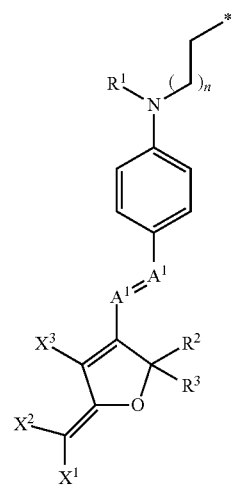

Formula 1-7

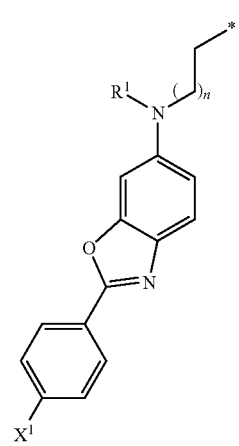

Formula 1-8

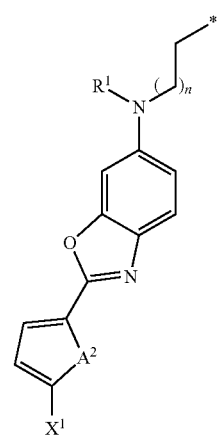

In Chemical Formulae 1-1 to 1-8, $R^1$, $R^2$, and $R^3$ are independently hydrogen, a substituted or unsubstituted C1 to C10 alkyl group, a substituted or unsubstituted C3 to C10 cycloalkyl group, a substituted or unsubstituted C6 to C30 aryl group, or a combination thereof, $A^1$ is independently CH or N, $X^1$, $X^2$, and $X^3$ are independently —$NO_2$, —CN, —C(CN)=C($CN_2$), R—(C=O)O— (wherein R is a substituted or unsubstituted C1 to C10 alkyl group, or a substituted or unsubstituted C6 to C30 aryl group), a halogen element, a haloalkyl group, or a C1 to C10 alkyl group that is unsubstituted or substituted with a sulfone group ($-SO_2$), n is an integer from 1 to 11, and

* represents a linking point with the functional group represented by Chemical Formula 3.

A nonlinear optic material according to another embodiment may be prepared from the composition according to an embodiment or may be prepared from the method of the nonlinear optic material according to another embodiment.

The composition according to an embodiment may not, and preferably does not, require a separate poling process for the preparation of the nonlinear optic material because of the phase-separation characteristics between the organic chromophore and the inorganic material polymer. Therefore, when using the composition according to an embodiment, it is possible to easily and simply prepare a nonlinear optic material without an additional poling process, and therefore, lead to a reduction in preparation costs. In addition, by omitting the poling process, the possibility of damaging the matrix and/or organic chromophore due to high temperature and high voltage may be minimized. Accordingly, the method of preparation may be advantageously used for the preparation of an optic material having excellent nonlinear optic properties and the production of an optic device using the same.

BRIEF DESCRIPTION OF THE DRAWINGS

The patent or application file contains at least one drawing executed in color. Copies of this patent or patent application publication with color drawing(s) will be provided by the Office upon request and payment of the necessary fee. Acceptance of the color drawings is respectfully requested.

DETAILED DESCRIPTION

Figure 1:
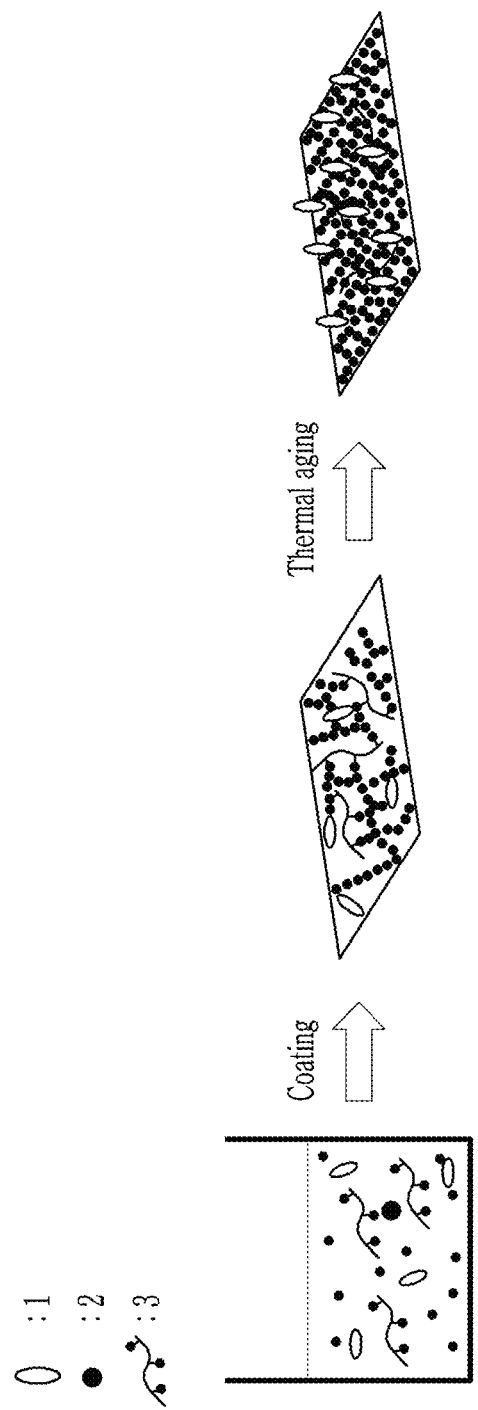
FIG. 1 is a schematic representation of a method of preparing a nonlinear optic material according to an embodiment.

Exemplary embodiments will hereinafter be described in the detailed description. However, these embodiments are exemplary, the present disclosure is not limited thereto and the present disclosure is defined by the scope of claims.

The invention now will be described more fully hereinafter with reference to the accompanying drawings, in which various embodiments are shown. Like reference numerals refer to like elements throughout.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±10% or ±5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, when specific definition is not otherwise provided, "substituted" refers to replacement of at least one hydrogen of a given functional group by a substituent that is a halogen atom (F, Cl, Br, or I), a hydroxy group, a nitro group, a cyano group, an amino group $-NH_2$, $-NH(R^{100})$ or $-N(R^{101})(R^{102})$, wherein $R^{100}$, $R^{101}$, and $R^{102}$ are the same or different, and are independently a C1 to C10 alkyl group), an amidino group, a hydrazine group, a hydrazone group, a carboxyl group, an ester group, a ketone group, a substituted or unsubstituted alkyl group, a substituted or unsubstituted alicyclic organic group (e.g., cycloalkyl group, etc.), a substituted or unsubstituted aryl group (e.g., benzyl group, naphthyl group, fluorenyl group, etc.), a substituted or unsubstituted alkenyl group, a substituted or unsubstituted alkynyl group, a substituted or unsubstituted heteroaryl group and a substituted or unsubstituted heterocyclic group, or the substituents may be linked to each other to form a ring. As used herein, when specific definition is not otherwise provided, "alkyl group" refers to a C1 to C30 alkyl group, and specifically a C1 to C15 alkyl group, "cycloalkyl group" refers to a C3 to C30 cycloalkyl group, and specifically a C3 to C18 cycloalkyl group, "alkoxy group" refers to a C1 to C30 alkoxy group, and specifically a C1 to C18 alkoxy group, "ester group" refers to a C2 to C30 ester group, and specifically a C2 to C18 ester group, "ketone group" refers to a C2 to C30 ketone group, and specifically a C2 to C18 ketone group, "aryl group" refers to a C6 to C30 aryl group, and specifically a C6 to C18 aryl group, and "alkenyl group" refers to a C2 to C30 alkenyl group, and specifically a C2 to C18 alkenyl group.

As used herein, when specific definition is not otherwise provided, the term "combination" refers to mixing or copolymerization. Herein, "copolymerization" refers to a random copolymerization, a block copolymerization, or a graft copolymerization.

As used herein, the term "polyimide" refers to "polyimide", "polyamic acid" and a combination thereof as well as "polyimide" itself. The terms "polyimide" and "polyamic acid" may be used to have the same meanings.

In addition, as used herein, "*" refers to a point of attachment to an adjacent atom, repeat unit, or to another portion of a compound or chemical formula.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it may be disposed directly on the other element or intervening elements may also be present. In contrast, when an element is referred to as being "directly on" another element, there are no intervening elements present.

As described above, the making of an electro-optic device, and organic nonlinear optic materials that are more workable and may be produced at lower cost has attracted attention. Although organic nonlinear optic materials have superior characteristics compared with inorganic materials such as lithium niobate (a known electro-optic material), there are problems associated with the use of organic nonlinear optic materials in that the electro-optic properties are not thermally stable and the light transmission loss is large. Among various known methods for minimizing these problems, one is a method of preparing an organic optoelectronic polymer material by fixing and dispersing an organic chromophore material having polarization characteristics in a polymer or in an inorganic material. In this case, unlike the case of using an inorganic crystal material, it is known that a poling process for orienting the chromophore material in one direction (z-axis) is essential. The poling process involves applying a high voltage at high temperatures, which may damage the materials and chromophores present in the matrix, and lead to the deterioration of nonlinear optic (NLO) properties. In addition, the need for the additional step of a poling process leads to problems of process difficulties, increased preparation costs, and the like.

The inventors sought to prepare a nonlinear optic material exhibiting nonlinear optic properties (NLO) without the need for the additional poling process step in the preparation of a NLO material that includes an organic chromophore having polarization characteristics. In view of a phenomenon of phase-separation, e.g., in the instance when two materials that are not compatible are mixed, the inventors in their research developed a composition including an organic chromophore and a precursor of an inorganic material that is transformed into inorganic material polymer. However, the inventors in their work also discovered that the organic chromophore and a precursor of an inorganic material are non-compatible. To address this issue of non-compatibility, the inventors add a compatibilizer to the composition, which may be bound to or bind with both the organic chromophore and the precursor of the inorganic material polymer.

Accordingly, a composition for preparing a nonlinear optic material according to an embodiment includes (i) an organic chromophore that is polarized by an electric field, (ii) a precursor to an inorganic material polymer that is formed by a sol-gel reaction, and (iii) a compatibilizer capable of being bound to or that can bind with both the organic chromophore and the inorganic material polymer, wherein the organic chromophore includes a functional group at a terminal end that is capable of being bound to or that can bind with both the inorganic material polymer and the compatibilizer.

The composition according to an embodiment is advantageous, in that the organic chromophore, which is polarized by an electric field, and the inorganic material polymer formed by sol-gel reaction do not mix well, i.e., they are non-compatible with each other, but the composition including them may nonetheless readily provide an electro-optic material using a solution process such as coating. The composition includes the precursor of the inorganic material polymer so as to form the inorganic material polymer by a sol-gel reaction, and the compatibilizer that is capable of being bound to both the organic chromophore and the inorganic material polymer. Moreover, a terminal end of the organic chromophore may include a functional group capable of being bound to both of the inorganic material polymer and the compatibilizer, or all of the precursor of the inorganic material polymer, the inorganic material polymer, and the compatibilizer. Thereby, the composition according to an embodiment, the composition may be uniformly mixed together with each other, and coated on a substrate using a solvent, then heated and cured. Without being bound by theory, it is believed that during this process, the functional group included at a terminal end of the organic chromophore that is capable of binding to the inorganic material polymer, the functional group in the compatibilizer that is capable of being bound to both the inorganic material polymer and the organic chromophore, and the precursor of the inorganic material polymer may be bound to each other by a hydrolysis and condensation reaction. During or upon completion of this process, the organic chromophore may be primarily aligned in one direction, extending away from the inorganic material polymer instead of being aligned in a plane where the inorganic material polymer is present due to a non-compatibility with the inorganic material polymer, particularly when the organic chromophore is bound to the compatibilizer and/or an inorganic material polymer formed by the sol-gel reaction. Thereby, the composition according to an embodiment may provide a nonlinear optic material in which the organic chromophore is primarily aligned along one direction without the need for performing an additional poling process, simply by coating the solution of the composition on a substrate or the like, removing the solvent, and performing a heat treatment to initiate the sol-gel reaction of the inorganic precursor. FIG. 1 is a schematic representation showing the process.

Referring to FIG. 1, an organic chromophore 1, a precursor 2 of an inorganic material polymer, and a compatibilizer 3 is mixed the organic chromophore and the precursor of the inorganic material polymer in the presence of a solvent to provide a composition according to an embodiment. The composition is coated on a substrate by a spin coating, or a like process, to provide a layer. In the coated layer, the organic chromophore, the precursor of the inorganic material polymer, and the compatibilizer are randomly arranged relative to each other, but by heating the coating (the layer on the substrate), the precursor of the inorganic material polymer forms a network by a sol-gel reaction and forces the organic chromophore having a negative compatibility with the inorganic material polymer in primarily one direction, and thereby, provide for the aligning of the organic chromophore. Accordingly, the obtained nonlinear optic material may be directly formed as an optic material having nonlinear optic properties without the need for an additional poling process step. The nonlinear optic properties of the obtained material may be measured in a specific value using a Teng-man method or the like as described in the examples that follow.

The organic chromophore may be used as long as it exhibits polarization characteristics in an electric field. The organic chromophore group may be, for example, one or more of Chemical Formula 1-1 to Chemical Formula 1-8:

Formula 1-1
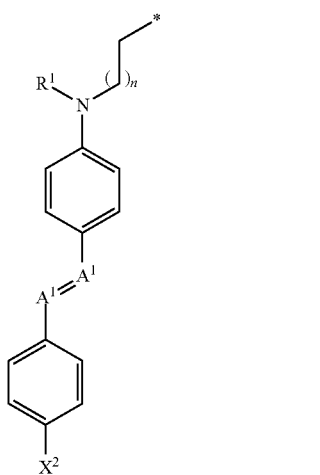
Formula 1-4
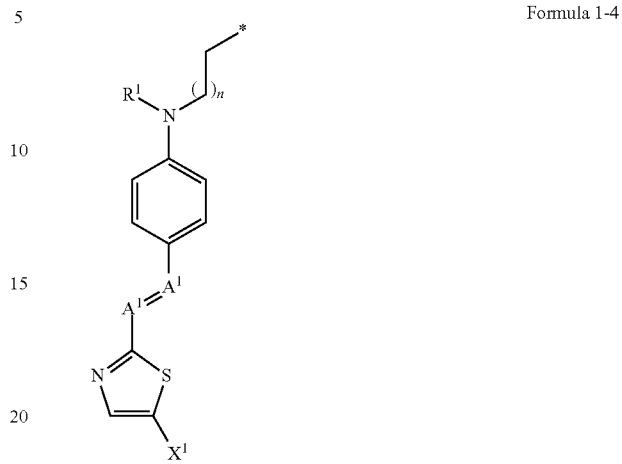
Formula 1-2
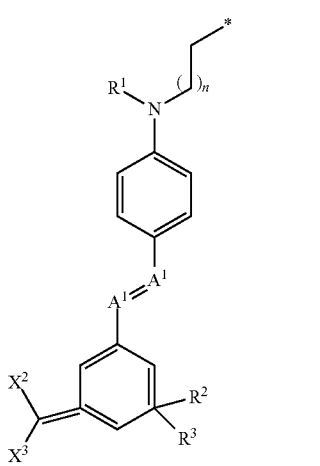
Formula 1-5
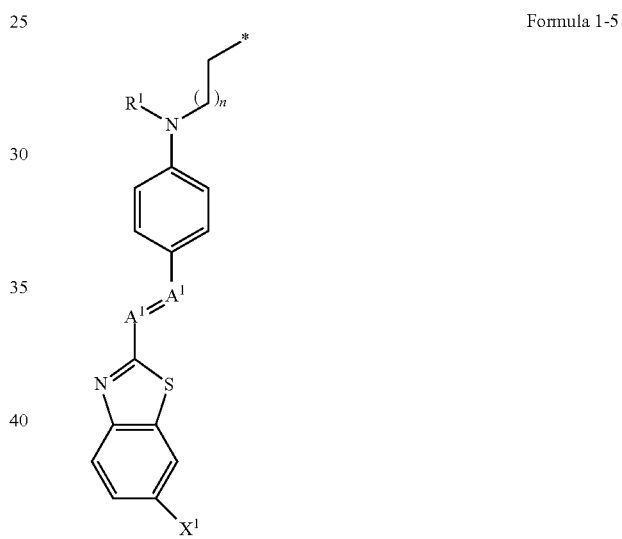
Formula 1-3
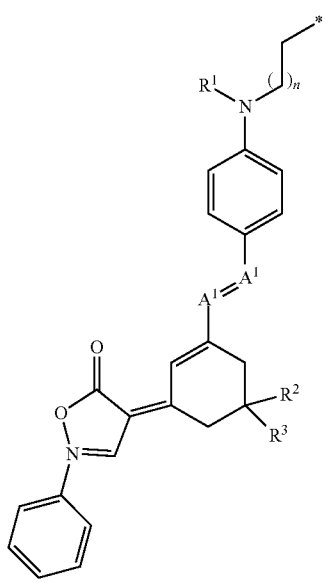
Formula 1-6
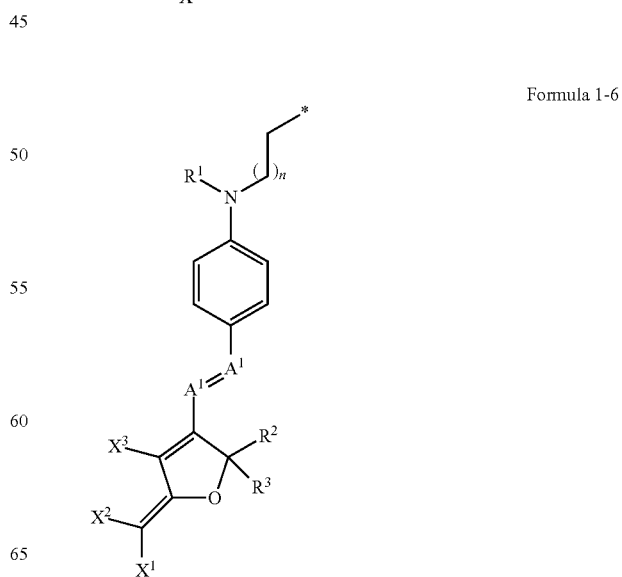

Formula 1-7

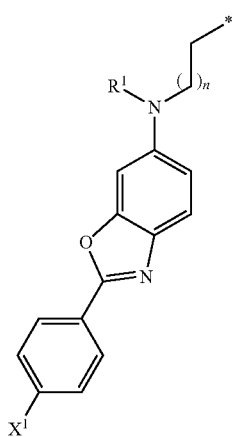

Formula 1-8

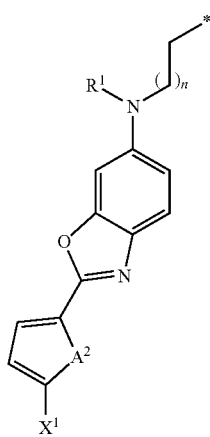

In Chemical Formulas 1-1 to 1-8,
$R^1$, $R^2$, and $R^3$ are independently hydrogen, a substituted or unsubstituted C1 to C10 alkyl group, a substituted or unsubstituted C3 to C10 cycloalkyl group, a substituted or unsubstituted C6 to C30 aryl group, or a combination thereof, $A^1$ is independently CH or N, $X^1$, $X^2$, and $X^3$ are independently —$NO_2$, —CN, —C(CN)=C($CN_2$), R—(C=O)O— (wherein R is a substituted or unsubstituted C1 to C10 alkyl group, or a substituted or unsubstituted C6 to C30 aryl group), a halogen element, a haloalkyl group, or a C1 to C10 alkyl group that is unsubstituted or substituted with a sulfone group (—$SO_2$), n is an integer from 1 to 11,

* represents a linking point where the organic chromophore group is linked to the functional group capable of being bound to both the inorganic material polymer and the compatibilizer.

In an embodiment, the organic chromophore group may be represented by one or more of Chemical Formulas 1-1, 1-4, or 1-5. In Chemical Formulas 1-1, 1-4, and 1-5, $X^1$ and $X^2$ may independently be —$NO_2$, —CN, a halogen element, a haloalkyl group, or a C1 to C10 alkyl group that is unsubstituted or substituted with a sulfone group (—$SO_2$), $A^1$ may be N, and $R^1$ may be a substituted or unsubstituted C1 to C10 alkyl group.

For example, in Chemical Formula 1-1, 1-4, and 1-5, $X^1$ and $X^2$ may independently be —$NO_2$ or —CN, $A^1$ may be N, and $R^1$ may be a substituted or unsubstituted C1 to C10 alkyl group.

In an embodiment, the organic chromophore group may be represented by one or more of the following chemical formulae:

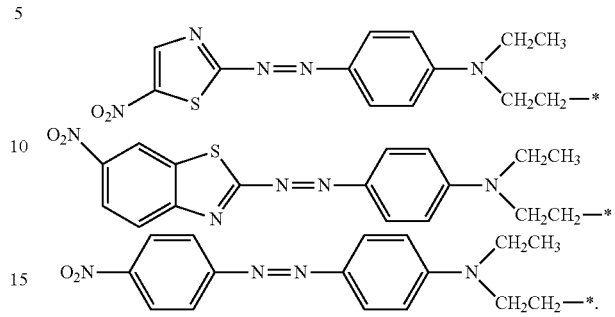

In an embodiment, the chromophore group may be represented by Chemical Formula 1-1, wherein in Chemical Formula 1-1, $A^1$ may be a nitrogen atom, $R^1$ may be an ethyl group, $X^1$ may be a NO 2 group, and n may be 1, and may be derived from Disperse red 1.

Meanwhile, a method of forming an inorganic material polymer by a sol-gel reaction is well known. The sol-gel reaction is a method of producing a solid material from small molecules, which involves converting monomolecular compounds into a colloidal solution, i.e., a sol which acts as a precursor for forming gels, i.e., an integrated network of discrete particles or polymers on a network. Typical examples of the precursors include, but are not limited to, a metal alkoxide. The precursor for forming the inorganic material polymer by a sol-gel reaction may be for example represented by Chemical Formula 2:

$$(R^a)_m(R^b)_n(R^c)_l\text{-M-}(OR^d)_{4-m-n-l} \quad \text{Chemical Formula 2}$$

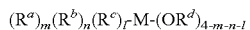

In Chemical Formula 2,
$R^a$, $R^b$, $R^b$, and $R^d$ may independently be hydrogen, a substituted or unsubstituted C1 to C30 alkyl group, a substituted or unsubstituted C2 to C30 alkenyl group, or a substituted or unsubstituted C2 to C30 alkynyl group, having at least one double bond or triple bond, respectively, a substituted or unsubstituted C3 to C30 cycloalkyl group, or a substituted or unsubstituted C6 to C30 aryl group, m, n, and l may independently be an integer of 0 or 1, provided that 0≤m+n+l≤2, and M may be Si, Ti, Al, Hf, Sn, Zr, Ga, Ge, In, or Sb.

For example, M of Chemical Formula 2 may be Si, Ti, or Al, $R^a$, $R^b$, $R^c$, and $R^d$ may independently be hydrogen, a substituted or unsubstituted C1 to C30 alkyl group, a substituted or unsubstituted C3 to C30 cycloalkyl group, or a substituted or unsubstituted C6 to C30 aryl group, for example, a substituted or unsubstituted C1 to C10 alkyl group, or a substituted or unsubstituted C6 to C10 aryl group, m, n, and l may independently be an integer of 0 or 1, provided that m+n+l≤1, for example, m+n+l=0, and M may be Si, Ti, or Al.

In an embodiment, M of Chemical Formula 2 may be Si, m+n+l=0, wherein $R^d$ may be an ethyl group. Therefore, the compound of Chemical Formula 2, which forms an inorganic material polymer by a sol-gel reaction in an embodiment, may be tetraethyl orthosilicate (TEOS).

The method of preparing the compound represented by Chemical Formula 2 as an inorganic material polymer using a sol-gel reaction, the method may include a heat treating under an acid or basic catalyst to continuously bind —($OR^d$) groups of the compound represented by Chemical Formula 2 through M and —O— group of other compounds represented by Chemical Formula 2, e.g., by hydrolysis and condensation reactions, to provide an inorganic material polymer formed by binding a network of M and O such that one may form a continuity of —O-M-O— bonds.

The compatibilizer in the composition is a material capable of being bound to both the organic chromophore and the inorganic material polymer, and thus, provides for better mixing of the precursor of the inorganic material polymer and the organic chromophore in the composition. As the composition according to an embodiment includes the compatibilizer, the organic chromophore and the precursor of an inorganic material polymer may be more uniformly mixed, particularly, if the composition includes a solvent, the latter of which helps the composition to form a solution state. Accordingly, the compatibilizer confers the organic chromophore and an inorganic material polymer to be well mixed with minimal or no phase-separation. Furthermore, as the compatibilizer is a material capable of being bound to both the organic chromophore and the inorganic material polymer, a nonlinear optic material prepared from the composition according to an embodiment, the compatibilizer is bound to the organic chromophore and the inorganic material polymer, the latter being stably present in the nonlinear optic material.

In an embodiment, the compatibilizer may be a polymer including a functional group represented by Chemical Formula 3 in the side chain:

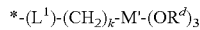
            Chemical Formula 3

In Chemical Formula 3,
$L^1$ is a single bond, —(C=O)O—, —O—, —S—, —SO$_2$—, —NR$^e$R$^f$—, —(C=O)NR$^g$—, —O(C=O)NR$^h$— (wherein R$^e$ to R$^h$ are independently hydrogen, a substituted or unsubstituted C1 to C30 alkyl group, a substituted or unsubstituted C3 to C30 cycloalkyl group, or a substituted or unsubstituted C6 to C30 aryl group), or a combination thereof, M' is Si, Ti, Al, Hf, Sn, Zr, Ga, or Ge, R$^d$ is hydrogen, a substituted or unsubstituted C1 to C30 alkyl group, a substituted or unsubstituted C2 to C30 alkenyl group, or a or a substituted or unsubstituted C2 to C30 alkynyl group, having at least one double bond or triple bond, respectively, a substituted or unsubstituted C3 to C30 cycloalkyl group, or a substituted or unsubstituted C6 to C30 aryl group, k is an integer of 0 to 30, and

* represents a linking point with the side chain of the polymer.

As shown in Chemical Formula 3, the functional group included in the compatibilizer includes a metal M' equivalent to or similar to one included in the inorganic material polymer obtained from the composition, and includes —(OR$^d$)$_3$ group as the precursors of the inorganic material polymer include. The —(OR$^d$)$_3$ group included in the functional group represented by Chemical Formula 3 connected to the compatibilizer may also participate in the hydrolysis condensation reaction when the composition is subjected to a heating treatment. Thereby, the compatibilizer may be bound to M of the precursor of the inorganic material polymer through —O— as in the precursor of the inorganic material polymer. Accordingly, the compatibilizer may be bound to an inorganic material polymer of the nonlinear optic material obtained from the composition according to an embodiment.

In an embodiment, $L^1$ of Chemical Formula 3 may be a single bond, or, —(C=O)O—, —O—, —(C=O)NR$^g$—, —O(C=O)NR$^h$— (wherein R$^e$ to R$^h$ are independently hydrogen, a substituted or unsubstituted C1 to C10 alkyl group, a substituted or unsubstituted C3 to C10 cycloalkyl group, or a substituted or unsubstituted C6 to C10 aryl group), or a combination thereof, M' may be Si, Ti, or Al, R$^d$ may be hydrogen, a substituted or unsubstituted C1 to C10 alkyl group, a substituted or unsubstituted C3 to C10 cycloalkyl group, or a substituted or unsubstituted C6 to C10 aryl group, k may be an integer of 0 to 10, and * may be a linking point with the side chain of the polymer.

The polymer including the functional group represented by Chemical Formula 3 in the side chain of the compatibilizer may include poly(meth)acrylate, polyvinyl, polyalcohol, polyimide, polyamide, polyester, polyurethane, or a combination thereof, but is not limited thereto.

The polymer for forming the compatibilizer may be any polymer as long as it is capable of being bound to both the organic chromophore and the inorganic material polymer, and also facilitates the mixing of the organic chromophore and the precursor of the inorganic material polymer in the composition. In an embodiment, the polymer may be poly(meth)acrylate having a structure preferably substituted with a functional group represented by Chemical Formula 3 in the side chain, but is not limited thereto.

In an embodiment, the compatibilizer may be a polymer including a structural unit represented by Chemical Formula 4-1 or a structural unit represented by Chemical Formula 4-2, or a polymer including a structural unit represented by Chemical Formula 4-1 and a structural unit represented by Chemical Formula 4-2:

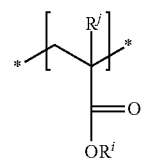
            Chemical Formula 4-1

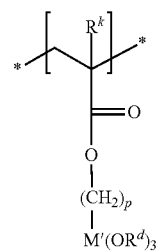
            Chemical Formula 4-2

In Chemical Formulas 4-1 and 4-2,
R$^d$ and R$^i$, R$^j$ and R$^k$ are independently hydrogen, a substituted or unsubstituted C1 to C30 alkyl group, a substituted or unsubstituted C2 to C30 alkenyl group, or a substituted or unsubstituted C2 to C30 alkynyl group having at least one double bond or triple bond, respectively, a substituted or unsubstituted C3 to C30 cycloalkyl group, or a substituted or unsubstituted C6 to C30 aryl group, M' is Si, Ti, Al, Hf, Sn, Zr, Ga, or Ge, p is an integer of 0 to 10, and

* represents a linking point with other structural units.

In Chemical Formulas 4-1 and 4-2, R$^d$ and R$^i$, R$^j$ and R$^k$ may independently be hydrogen, a substituted or unsubstituted C1 to C10 alkyl group, a substituted or unsubstituted C3 to C10 cycloalkyl group, or a substituted or unsubstituted C6 to C10 aryl group, M' may be Si, Ti, or Al, p may be o an integer of 0 to 5, and * may be a linking point with other structural units.

In an embodiment, in Chemical Formulas 4-1 and 4-2, $R^d$ and $R^i$, $R^j$, and $R^k$ may be all methyl groups, M' may be Si, p may be one of integers from 1 to 4, and * may be a linking point with other structural units or.

The polymer for forming the compatibilizer may have a weight average molecular weight ranging from about 3,000 grams per mole (g/mol) to about 100,000 g/mol, for example, about 5,000 g/mol to about 100,000 g/mol, about 5,000 g/mol to about 80,000 g/mol, about 5,000 g/mol to about 50,000 g/mol, about 5,000 g/mol to about 30,000 g/mol, or about 5,000 g/mol to about 25,000 g/mol, but is not limited thereto.

When the polymer for forming the compatibilizer has the ranged molecular weight, one may easily control a viscosity of the composition according to an embodiment, and the compatibilizer may be appropriately bound to the organic chromophore and/or the inorganic material polymer. When the compatibilizer is out of the range of the molecular weight, the compatibilizer may interfere with forming a network of the inorganic material polymer or may have unfavorable influence on forming a network, and also may result in an increase in phase-separation in the mixing of the organic chromophore with the inorganic material polymer. In addition, when the compatibilizer is less than the range of the molecular weight, the binding efficiency of the inorganic material polymer and/or the organic chromophore may insufficient to achieve an appropriate phase-separation effect and a uniform mixing of the organic chromophore with the inorganic material polymer.

On the other hand, the compatibilizer may include the functional group represented by Chemical Formula 3 in an amount of less than or equal to about 50 mole percent (mol %) based on the total moles of all structural units of the polymer of the compatibilizer. For example, the compatibilizer may include the functional group represented by Chemical Formula 3 in an amount of less than or equal to about 45 mol %, less than or equal to about 40 mol %, less than or equal to about 35 mol %, or less than or equal to about 30 mol %, and for example, greater than or equal to about 5 mol %, greater than or equal to about 10 mol %, greater than or equal to about 15 mol %, greater than or equal to about 20 mol %, greater than or equal to about 25 mol % based on the total moles of all structural units of the polymer of the compatibilizer, but is not limited thereto.

When the compatibilizer includes a functional group represented by Chemical Formula 3 within the above amount range based on the total moles of all structural units of the polymer, the compatibilizer may be bound to each of the organic chromophore and the inorganic material polymer in an appropriate ratio, thereby, the nonlinear optic material obtained from the composition according to an embodiment may have excellent nonlinear optic characteristics.

Meanwhile, the organic chromophore in the composition according to an embodiment has a functional group at a terminal end which is capable of being bound to both the inorganic material polymer and the compatibilizer. Accordingly, when the nonlinear optic material is prepared from the composition according to an embodiment, the organic chromophore may be bound to the inorganic material polymer and/or the compatibilizer. In an embodiment, by binding the organic chromophore with the inorganic material polymer and/or the compatibilizer in the nonlinear optic material obtained from the composition, the resulting nonlinear optic material is more stable and may exhibit improved electronic optic properties.

The functional group included in a terminal end of the organic chromophore may be any functional group as long as the group is capable of being bound to both the inorganic material polymer and the compatibilizer. The functional group is not particularly limited but may be a functional group represented by Chemical Formula 3 in a side chain of the polymer of the compatibilizer. When the organic chromophore has the functional group represented by Chemical Formula 3 as the functional group, —($OR^d$) included in Chemical Formula 3 may be bound to a metal M included in the inorganic material polymer and/or a metal M' included in the functional group of the compatibilizer through —O— by a hydrolysis condensation reaction when the organic chromophore, together with a precursor of the inorganic material polymer and the compatibilizer, and the composition including the same are heated. Thereby, the organic chromophore may be bound to the inorganic material polymer and/or the compatibilizer and form a network in the nonlinear optic material.

In an embodiment, the functional group represented by Chemical Formula 3, which is bound to a terminal end of the organic chromophore, can be represented by Chemical Formula 5:

$$*—O(C=O)NR^l—(CH_2)_k\text{-M'-}(OR^d)_3 \qquad \text{Chemical Formula 5}$$

In Chemical Formula 5,
R' is hydrogen, a substituted or unsubstituted C1 to C30 alkyl group, a substituted or unsubstituted C3 to C30 cycloalkyl group, or a substituted or unsubstituted C6 to C30 aryl group,
M' is Si, Ti, or Al,
$R^d$ is a substituted or unsubstituted C1 to C10 alkyl group,
k is an integer of 1 to 10, and
* represents a linking point with a terminal end of the organic chromophore.

In the composition according to an embodiment, the organic chromophore may be included in an amount of less than or equal to about 30 weight percent based on a total mass of the composition including the organic chromophore, the precursor of the inorganic material polymer, and the compatibilizer. For example, the organic chromophore may be included in an amount of less than or equal to about 25 weight percent, less than or equal to about 20 weight percent, less than or equal to about 18 weight percent, or less than or equal to about 15 weight percent based on a total mass of the composition. For example, the organic chromophore may be included in an amount of greater than or equal to about 1 weight percent, greater than or equal to about 2 weight percent, greater than or equal to about 3 weight percent, greater than or equal to about 3.5 weight percent, or greater than or equal to about 5 weight percent based on a total mass of the composition, but is not limited thereto. For example, in the composition according to an embodiment, the organic chromophore may be included in an amount of greater than or equal to about 1 weight percent and less than or equal to about 25 weight percent, greater than or equal to about 1.5 weight percent and less than or equal to about 20 weight percent, or greater than or equal to about 1.5 weight percent and less than or equal to about 18 weight percent based on a total mass of the composition including the organic chromophore, the precursor of the inorganic material polymer, and the compatibilizer, but is not limited thereto.

As understood in the following examples, when the amount of the organic chromophore is outside of the above weight percent range, the nonlinear optic material will more likely tend to form a film with an increase in haze. In addition, when the organic chromophore is present below the weight percent range, it may not obtain the desirable electronic optical properties. Generally, within the above range, as the amount of the organic chromophore is increased above 1 weight percent, the nonlinear optic properties of the nonlinear optic material tends to improve. This fact means that the composition according to an embodiment provides effective nonlinear optic properties in proportion to an amount of the organic chromophore when the organic chromophore is included within the amount range even though the poling process is not performed during the making of the nonlinear optic material.

In the composition according to an embodiment, the precursor of the inorganic material polymer and the compatibilizer may be included at a mole ratio of about 9.9:0.1 to about 2:8. For example, the precursor of the inorganic material polymer and the compatibilizer may be included at a mole ratio of about 9.7:0.3 to about 2.5:7.5, for example, at a mole ratio of about 9.5:0.5 to about 3:7, at a mole ratio of about 9.5:0.5 to about 3.5:6.5, at a mole ratio of about 9.3:0.7 to about 3.5:6.5, at a mole ratio of about 9:1 to about 4:6, at a mole ratio of about 8.5:1.5 to about 4:6, or at a mole ratio of about 8:2 to about 4:6, but is not limited thereto.

When the mole ratio of the precursor of the inorganic material polymer and the compatibilizer is within the above range, the nonlinear optic material obtained from the composition according to an embodiment may show excellent nonlinear optic properties. When a ratio of the compatibilizer to the precursor of the inorganic material polymer is greater than and outside the range, the nonlinear optic properties of the nonlinear optic material obtained from the composition are less favorable. Without being bound by theory, it is believed that as the amount of compatibilizer increases beyond the above range, the organic chromophore becomes so well dispersed into the inorganic material polymer included in the composition, that the organic chromophore is less arranged or oriented in one direction. The composition according to an embodiment may further include a solvent.

The solvent may be any solvent as long as it does not react with the organic chromophore in the composition, the precursor of the inorganic material polymer, and the compatibilizer. The solvent facilitates dissolution and/or dispersing of each of the composition components, and therefore, provide a more consistent sol-gel reaction for preparing a nonlinear optic material. For example, the solvent may include a polar organic solvent capable of being mixed with water. The polar organic solvent that may be mixed with water, and may be an alcohol-based solvent such as methanol, ethanol, propanol, and the like; a ketone-based solvent such as acetone, γ-butyrolactone, and the like; an ether-based solvent such as dimethyl ether, ethylmethyl ether, diethyl ether, and the like; a sulfoxide-based solvent such as dimethylsulfoxide, diethylsulfoxide, and the like; a formamide-based solvent such as N,N-dimethyl formamide, N,N-diethylformamide, and the like; an acetamide-based solvent such as N,N-dimethyl acetamide, N,N-diethylacetamide, and the like; a pyrrolidone-based solvent such as N-methyl-2-pyrrolidone, N-vinyl-2-pyrrolidone, and the like; or hexamethylphosphoramide, and the like. These may be used alone or in a mixture, but the polar organic solvent is not limited thereto.

The solvent may be included by adjusting the amount thereof within a range to provide an appropriate coating viscosity when the nonlinear optic material is prepared by coating the composition according to an embodiment on a substrate or the like. For example, the amount of solvent added may be in a range of about 0.5 times to about 1,000 times of the total moles of precursor, organic chromophore, and compatibilizer of the composition, for example, about 1 time to about 1,000 times, about 5 times to about 1,000 times, about 5 times to about 500 times, about 5 times to about 300 times, about 5 times to about 100 times, about 5 times to about 50 times, about 10 times to about 100 times, about 10 times to about 50 times, or about 10 times to about 30 times, but is not limited thereto.

In addition, the composition may further include a catalyst for accelerating the sol-gel reaction. For example, the catalyst may be an acidic catalyst or a basic catalyst, and may be selected and used among catalysts for accelerating a sol-gel reaction known in the technical sol-gel art.

Another embodiment provides a method of preparing a nonlinear optic material using the composition according to an embodiment. The method of preparing the nonlinear optic material includes preparing a composition including (i) an organic chromophore including a functional group represented by Chemical Formula 3 at a terminal end, and which can be polarized by an electric field, (ii) a precursor to inorganic material polymer formed by a sol-gel reaction, and (iii) a compatibilizer that is a polymer including a functional group represented by Chemical Formula 3 in the side chain:

$$*\text{-}(L^1)\text{-}(CH_2)_k\text{-}M'\text{-}R^d)_3 \qquad \text{Chemical Formula 3}$$

wherein, in Chemical Formula 3, $L^1$ is a single bond, —(C=O)O—, —O—, —S—, —SO$_2$—, —NR$^e$R$^f$—, —(C=O)NR$^g$—, —O(C=O)NR$^h$— (wherein R e to R$^h$ are independently hydrogen, a substituted or unsubstituted C1 to C30 alkyl group, a substituted or unsubstituted C3 to C30 cycloalkyl group, or a substituted or unsubstituted C6 to C30 aryl group), or a combination thereof, M' is Si, Ti, Al, Hf, Sn, Zr, Ga, or Ge, $R^d$ is hydrogen, a substituted or unsubstituted C1 to C30 alkyl group, a substituted or unsubstituted C2 to C30 alkenyl group, or a substituted or unsubstituted C2 to C30 alkynyl group, having at least one double bond or triple bond, respectively, a substituted or unsubstituted C3 to C30 cycloalkyl group, or a substituted or unsubstituted C6 to C30 aryl group, k is an integer of 0 to 30, and

* represents a linking point with the terminal end of the organic chromophore or the side chain of the polymer of the compatibilizer;

coating the composition on a substrate; and heating the coating such that the precursor of the inorganic material polymer forms an inorganic material polymer by a sol-gel reaction.

In the method of preparing a nonlinear optic material according to an embodiment, the precursor for forming an inorganic material polymer by a sol-gel reaction, the organic chromophore, and the compatibilizer are the same as described above, so the details thereof are omitted.

As described above, the method of preparing a nonlinear optic material with the composition according to an embodiment includes a sol-gel reaction by coating the composition on a substrate or the like, and then heating the same, so as to provide a nonlinear optic material according to an embodiment even though an additional poling process step is not used.

Generally, the temperature of the heating treatment for forming the an inorganic material polymer by the sol-gel reaction may be greater than or equal to about 100° C., for example, between about 100° C. and about 200° C., between about 120° C. and about 180° C., between about 130° C. and about 170° C., or about 150° C. Generally, in order to subject the poling process to a film or the like including the organic chromophore, the film including the organic chromophore is heated at greater than or equal to a glass transition temperature (Tg) of the polymer for forming the film, and simultaneously, is applied with a high voltage, so a matrix material for forming the organic chromophore or the film may be damaged by these process steps. Moreover, the polling process requires expensive equipment, a complicated production process, and longer production times. In contrast, in a process according to an embodiment the heating in the low temperature range of about 100° C. to about 200° C., an inorganic material polymer precursor may be converted to an inorganic material polymer through a sol-gel reaction to form a matrix. Quite surprisingly, we also find that the process of aligning the organic chromophore in one direction may be completed without a need for a polling process, which again, is a surprising unexpected effect to a person having ordinary skill in the art.

In the preparing method of an embodiment, the method of coating the composition on a substrate or the like may be appropriately selected from the various coating methods known in the technical fields pertaining to the art, for example, spin coating, bar coating, spray coating, doctor blade, dip coating, inkjet coating, or the like. In addition, as described above, the method of causing a sol-gel reaction by heating the coating may include heating the composition at between about 100° C. to about 200° C. Subsequently, the obtained nonlinear optic material is separated from the substrate and applied to the desirable electro-optic device to provide an electro-optic device.

Therefore, another embodiment provides a nonlinear optic material prepared from a composition for preparing a nonlinear optic material according to an embodiment or obtained by the method of preparing the nonlinear optic material according to an embodiment, and an electro-optic device including the same.

Examples of the electro-optic device may be an optical waveguide, a phase modulator, a light intensity modulator, a Mach-Zehnder interference system, a beam splitter, a directional coupler, an optical switch, or an X-switch, but are not limited thereto.

The embodiments are described in more detail through examples and comparative examples, but the following examples and comparative examples are for illustrative purposes only and the scope of the present invention is not limited thereto. Examples Synthesis Example 1: Synthesis of Organic Chromophore Including Functional Group Capable of Being Bound to Inorganic Material Matrix at One Terminal End Disperse Red1 (DR1) is reacted with 3-(triethoxysilyl) propyl-isocyanate (ICPTEOS) to chemically bind an organic chromophore DR1 to an inorganic material matrix. The DR1-TEOS includes a silane introduced to a terminal end of DR1.

Specifically, ICPTEOS (63.6 mmol, 15.7 g) and DR1 (31.8 mmol, 10 g) are dissolved in 150 mL of tetrahydrofuran (THF) and subjected to a reflux reaction at 70° C. for 24 hours. After completing the reaction, the product is precipitated in 1 L of hexane and filtered and washed using hexane, which are repeated for 2 to 3 times to remove non-reactants, so as to synthesize DR1-TEOS represented by the following chemical formula into which a silane group is introduced to a terminal end.

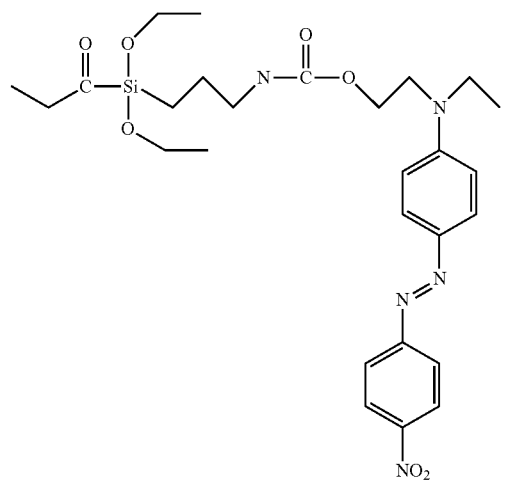 [SMILES: CCO[Si](CCCNC(=O)OCCN(CC)c1ccc(/N=N/c2ccc([N+](=O)[O-])cc2)cc1)(OCC)C(=O)CC]

Synthesis Example 2: Synthesis of Compatibilizer

Poly(methyl methacrylate/TMOS) (P(MMA/TMOS)) having a main chain of (meth)acrylate and a side chain of silane group as a compatibilizer is synthesized as shown in the following reaction scheme.

Reaction Scheme

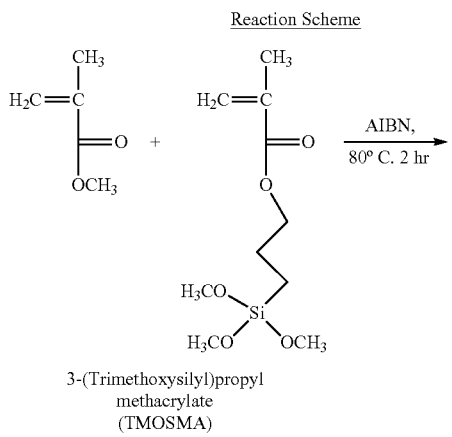

3-(Trimethoxysilyl)propyl methacrylate (TMOSMA)

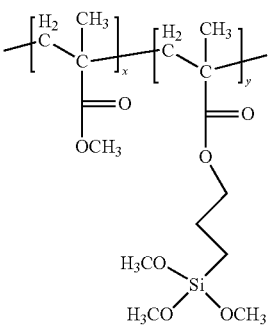

x/y = 7/3

Compatibilizer
(P(MMA/TMOS))

Specifically, methyl methacrylate (MMA) (70.0 mmol, 7 g) and trimethoxysilylpropyl methacrylate (TMOSMA) (12.1 mmol, 3 g) are used as monomers, a nitrogen ($N_2$) purging is performed for 30 minutes while being mixed together with azobisisobutyronitrile (0.3 mmol, 0.05 g), and then polymerization is performed at 80° C. for 2 hours.

After completing the polymerization, the product is dissolved in 100 mL of THF and precipitated in 1 L of hexane to provide P(MMA/TMOS).

Examples 1 to 3: Preparation of Nonlinear Optic Material

DR1-TEOS obtained from Synthesis Example 1, P(MMA/TMOS) obtained from Synthesis Example 2, and TEOS (tetraethoxy orthosilicate) as a precursor of an inorganic material polymer are dissolved in dimethyl formamide (DMF) in the amounts shown in Table 1, and acetic acid and deionized water are added to provide compositions for preparing a nonlinear optic material.

Each composition is reacted by stirring at room temperature for 15 hours, and then spin-coated on an indium tin oxide-coated glass (ITO glass) at 4,000 rpm to provide a film. The films are dried on a hot plate at 100° C. for 30 minutes, and then heated in an oven until 150° C. at a heating rate of 1° C./min and then dried for 12 hours to provide films having nonlinear optic properties.

TABLE 1

|  | DR1 content (wt %) | DR1-TEOS (mol) | TEOS (mol) | MMA/TMOS (mol) | DMF (mol) | Acetic acid (mol) | $H_2O$ (mol) |
|---|---|---|---|---|---|---|---|
| Example 1 | 3.8 | 0.01 | 0.8 | 0.2 | 3.83 | 3.83 | 3.83 |
| Example 2 | 15.2 | 0.05 | 0.8 | 0.2 | 3.95 | 3.95 | 3.95 |
| Example 3 | 38.5 | 0.25 | 0.8 | 0.2 | 4.55 | 4.55 | 4.55 |

Comparative Example 1: Preparation of Organic Chromophore-Grafted Polyimide Film As a comparative example, a polyimide film with an organic chromophore DR1 grafted in a side chain is prepared. The polyimide film is obtained by synthesizing diamine APAF-DR1 that chromophore compound of Disperse red1 (DR1) is conjugated in 2,2-bis(3-amino-4-hydroxyphenyl) hexafluoropropane (APAF) as a diamine component, as shown in the reaction scheme below; and reacting the same with 2,2'-bis(trifluoromethyl)-4,4'-diaminobiphenyl (TFDB) which is diamine not grafted with DR1 and 4,4'-4,4'-oxydiphthalic anhydride (ODPA) as a dianhydride component. Reaction Scheme showing a method of preparing the DR1-conjugated diamine APAF-DR1 is as follows:

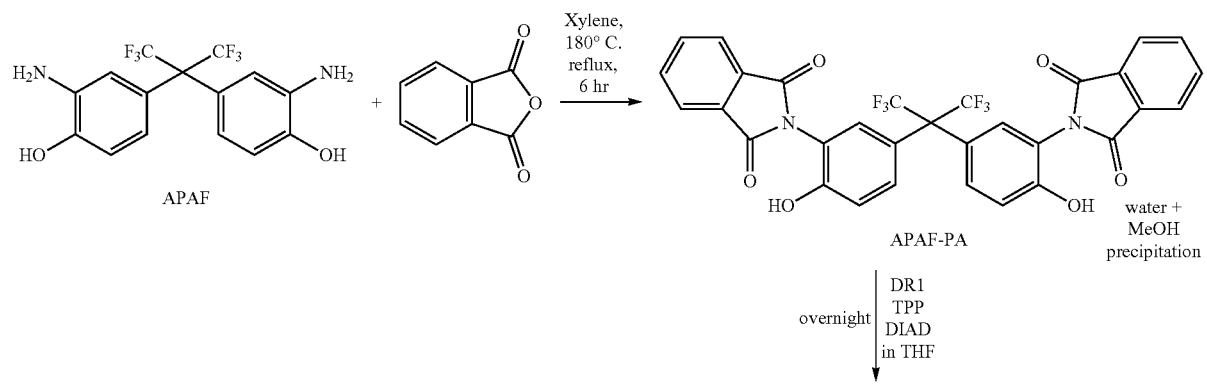

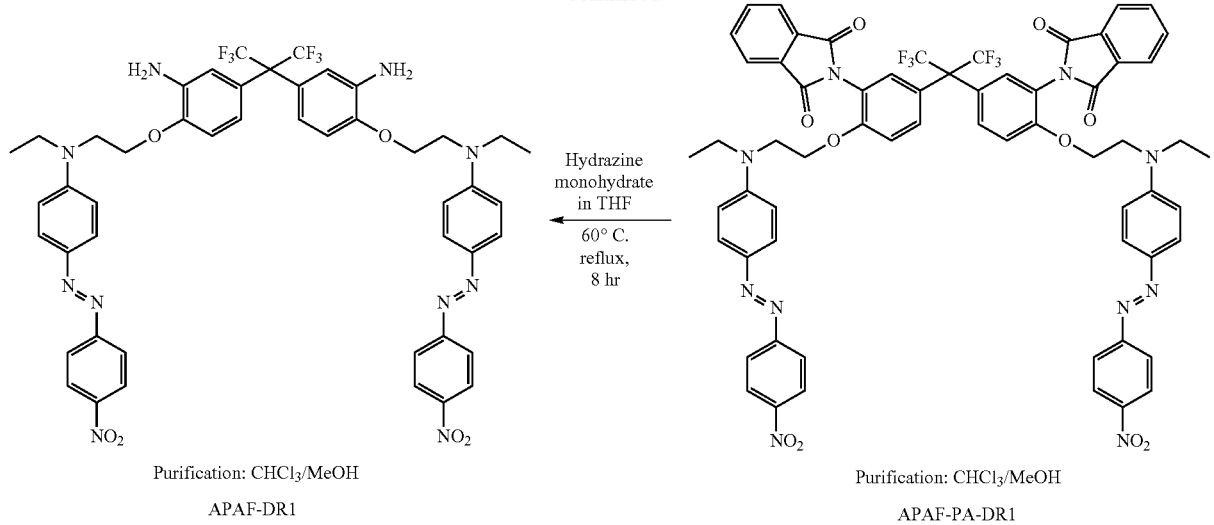

Purification: CHCl₃/MeOH
APAF-DR1

Purification: CHCl₃/MeOH
APAF-PA-DR1

The reaction is described in detail below.

(1) Synthesis of APAF (APAF-PA) Protected with Phthalimide 15 grams (g) of 2,2-bis(3-amino-4-hydroxyphenyl) hexafluoropropane (APAF) and 18.2 g of phthalic anhydride (PA) are added into a 250 mL round-bottomed flask, 50 mL of dimethyl formamide (DMF) is added thereto, and the obtained mixture is stirred at room temperature while purging nitrogen for 2 hours. Subsequently, 150 mL of xylene is added thereto and an azeotropic distillation is performed at 180° C. for 4 hours. Then, the solvent is evaporated (removed) at 180° C., and after cooling the same, is the solids are dissolved in 100 mL of DMF. The solution is added into 200 mL of methanol, and then added with 700 mL of water to provide a precipitate. The obtained precipitate is dried in a vacuum oven at 100° C. to provide a phthalimide-protected APAF (APAF-PA).

(2) Coupling Reaction of Chromophore Compound Disperse Red 1 (DR1) (APAF-PA-DR1)

20 g of the obtained APAF-PA and 20.0709 g of the chromophore compound of Disperse red1 are added into a 250 mL round-bottomed flask, and 200 mL of tetrahydrofuran (THF) is added thereto and dissolved. 25.1212 g of triphenylphosphine (TPP) is added into the solution and dissolved, and 18.8578 mL of diisopropyl azodicarboxylate (DIAD) is slowly added in a dropwise fashion by a syringe and reacted at room temperature overnight (about 12 hours). The reaction solution is moved to a 1 L beaker, and then 600 mL of methanol is added thereto and a precipitate forms. The precipitate is added to 200 mL of trichloromethane (CHCl₃) and stirred and dissolved, and then the temperature of the solution is increased up to 80° C. Subsequently, 300 mL of methanol is slowly added thereto and stirred at 80° C. Then it is stored in a freezer. The recrystallized solid is separated, then dried in a vacuum oven at 80° C. for 24 hours to provide APAF-PA-DR1 in which the chromophore compound of Disperse red 1 is coupled to the phthalimide-protected APAF.

(3) Phthalimide Deprotection 30 g of the synthesized APAF-PA-DR1 is added into a round-bottomed flask, and 100 mL of THF is added thereto and dissolved. Subsequently, 150 mL of hydrazine monohydrate is slowly added in a dropwise fashion by a syringe and refluxed at 70° C. for 4 hours. Then the reaction mixture is transferred to a separatory funnel and 100 mL of THF is added and the water layer is removed. 300 mL of methanol is slowly added to the separated organic layer and precipitate is formed. The precipitate is recrystallized by a mixture of trichloromethane/methanol (3/7) and dried in a vacuum oven at 80° C. for 24 hours to provide a chromophore compound DR1-conjugated diamine monomer (APAF-DR1).

Next, 1.90 g of the prepared DR1-conjugated diamine monomer (APAF-DR1) and 1.90 g DR1-unconjugated diamine monomer 2,2'-bis(trifluoromethyl)-4,4'-diaminobiphenyl (TFDB) are dissolved in 18.75 g of gamma-butyrolactone together with 2.45 g of 4,4'-oxydiphthalic anhydride (ODPA), and then polymerized for 48 hours. Subsequently, 0.80 g of pyridine and 1.86 g of acetic anhydride are added thereto and a chemical imidization is performed for 12 hours. The obtained solution is precipitated by 1 L of deionized water and washed with 1 L of ethanol to provide a polyimide copolymer (ODPA/AFAF-DR1/TFDB=100/25/75) including AFAF-DR1 and TFDB as a diamine component in a mole ratio of 25:75.

The molecular weight of the obtained polyimide copolymer is determined by gel permeation chromatography (GPC), the weight average molecular weight is about 122,822 g/mol, and the polydispersity index (PDI) is 2.3. In addition, a content of diamine (APAF-DR1) including chromophore introduced in the obtained polyimide (ODPA/APAF-DR1) which is measured by $^1$H-NMR analysis is about 9 wt %.

After dissolving the obtained DR1-grafted polyimide in N-2-methylpyrrolidone at 15 wt %, the solution is spin-coated on an indium tin oxide coated glass (ITO glass) at 4,000 rpm to provide a layer, dried on a hot plate at 100° C. for 30 minutes and after heating until 150° C. at a heating rate of 1° C./min, dried for 12 hours to provide a film in accordance with the same procedure as in Examples 1 to 3.

Examples 4 and 5: Preparation of Nonlinear Optic Material

Contents of DR1-TEOS obtained from Synthesis Example 1, DMF, acetic acid, and water are maintained equivalent to Example 2 shown in Table 1, but a mole ratio between MMA/TMOS obtained from Synthesis Example 2 and TEOS of a precursor of an inorganic material polymer is changed as shown in Table 2 to provide films having nonlinear optic properties according to Examples 4 and 5.

TABLE 2

|  | DR1 content (wt %) | DR1-TEOS (mol) | TEOS (mol) | MMA/TMOS (mol) | DMF (mol) | Acetic acid (mol) | H₂O (mol) |
| --- | --- | --- | --- | --- | --- | --- | --- |
| Example 2 | 15.2 | 0.05 | 0.8 | 0.2 | 3.95 | 3.95 | 3.95 |
| Example 4 | 15.2 | 0.05 | 0.6 | 0.4 | 3.95 | 3.95 | 3.95 |
| Example 5 | 15.2 | 0.05 | 0.2 | 0.8 | 3.95 | 3.95 | 3.95 |

Evaluation 1: Measurement of Phase-Separation Phenomena and Nonlinear Optic Properties Depending on Content of Organic Chromophore (DR1)

Figure 2:
FIG. 2 is a photograph of films prepared according to Example 1, Example 2, and Example 3.
Figure 2:
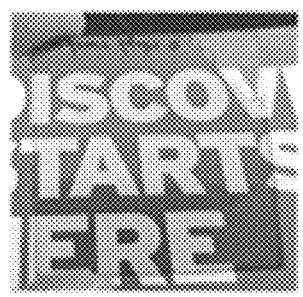
Figure 2:
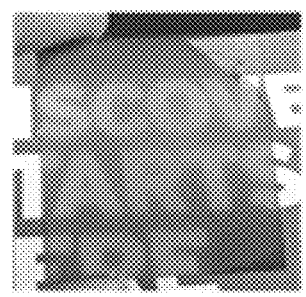

The film images according to Examples 1, 2, and 3 are shown in FIG. 2.

From FIG. 2, the films according to Examples 1 and 2 including DR1 having amounts of 3.8 wt % and 15.2%, respectively, are transparent, but the film according to Example 3 including DR1 in an amount as 38.5 wt % appears opaque. In other words, when the ratio of the organic chromophore in the composition is too high, haze is increased due to a phase separation from the inorganic material matrix even though the compatibilizer is present, so the film becomes opaque. As the layer becomes opaque by increasing haze as in Example 3, it is impossible to measure a value of a nonlinear optic property according to a Teng-man method.

Figure 3:
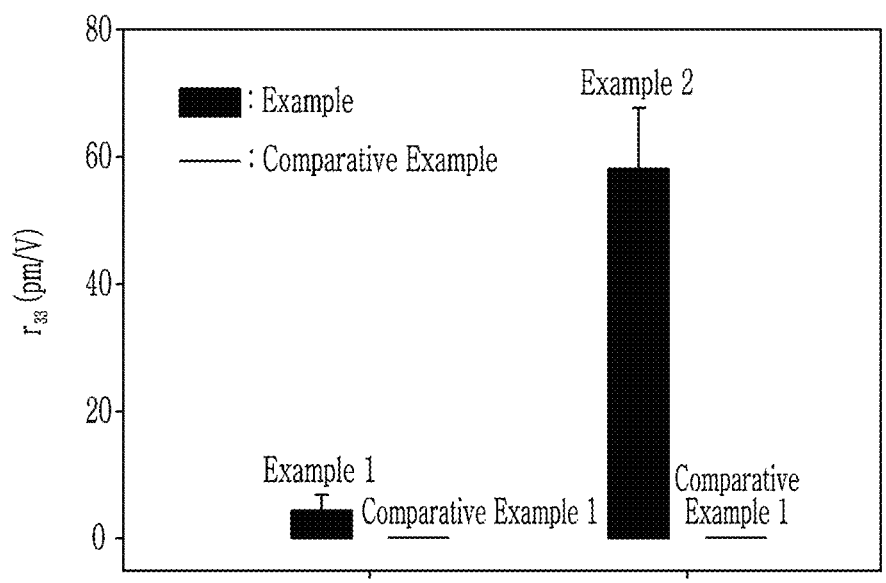
FIG. 3 is a graph showing $r_{33}$ values measured using a Teng-man method for the films according to Example 1, Example 2, and Comparative Example 1.

Gold (Au) is deposited on the films according to Examples 1 and 2 and the polyimide film obtained from Comparative Example 1 in a thickness of 500 Å, and $r_{33}$ value showing nonlinear optic properties is measured according to a Teng-man method, and the results are shown in a graph of FIG. 3.

As shown from FIG. 3, $r_{33}$ significantly increases to about 57 picometers per Volt (pm/V) as the DR1 content increases to 15.2 wt %, so it is understood that DR1 is aligned in one direction by a self-alignment although the additional poling process was not used in the preparation.

On the other hand, the polyimide film in which DR1 is grafted on the side chain of polyimide at 9 wt % is transparent, but as shown in FIG. 3, the $r_{33}$ value measured using the Teng-man method is 0, so it is understood that the film obtained without the poling process does not exhibit nonlinear optic properties.

Evaluation 2: Measurement of Nonlinear Optic Properties Depending on Content of Compatibilizer (P(MMA/TMOS))

Figure 4:
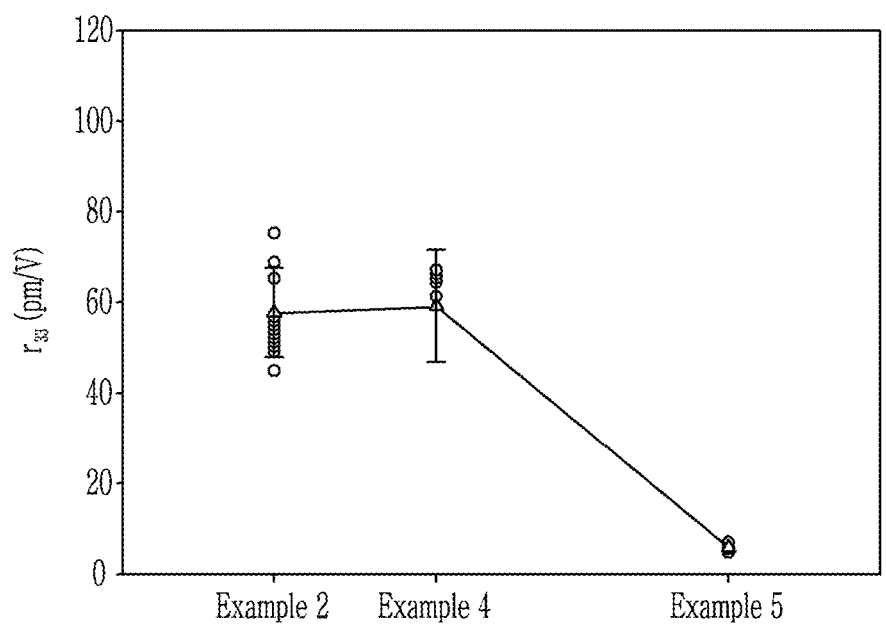
FIG. 4 is a graph showing $r_{33}$ values measured using a Teng-man method for the films according to Example 2, Example 4, and Example 5.

As shown in Table 2, for the films according to Examples 2, 4, and 5 having the same content of the organic chromophore but a different ratio of the compatibilizer to the inorganic matrix, the $r_{33}$ value is measured using a Teng-man method in accordance with the same procedure as in Evaluation 1, and the results are shown in FIG. 4.

As shown in FIG. 4, it is understood that the $r_{33}$ value showing the nonlinear optic properties decreases as a mole number of the compatibilizer is greater than 0.4 based on the total mole number of the inorganic matrix and the compatibilizer. In other words, it is understood that the nonlinear optic properties, shown when the organic chromophore is uniformly dispersed into the inorganic matrix and aligned in one direction, decreases as the content of the compatibilizer increases above the 0.4 content.

As reviewed above, the composition according to an embodiment includes an organic chromophore with a functional group capable of being bound to both the inorganic material polymer and/or the compatibilizer, a precursor of an inorganic material polymer which is converted to an inorganic material polymer by a sol-gel reaction, and a compatibilizer capable being bound to both the organic chromophore and the inorganic material polymer, so a nonlinear optic material having nonlinear optic properties may be easily obtained even though not performing an additional poling process, by coating the composition including these components on a substrate or the like according to a solution process and performing a heat treatment to cause a sol-gel reaction. The obtained nonlinear optic material may be well used in the various electro-optic devices requiring nonlinear optic properties.

While this disclosure has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A composition for preparing a nonlinear optic material, comprising
an organic chromophore compound that is polarized by an electric field,
a precursor that can form an inorganic material polymer by a sol-gel reaction, and
a compatibilizer polymer that can bind to both the organic chromophore and the inorganic material polymer,
wherein the organic chromophore compound comprises a functional group at a terminal end that can bind to both the inorganic material polymer and the compatibilizer polymer,
wherein the functional group at the terminal end of the organic chromophore compound is represented by Chemical Formula 3':

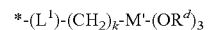   Chemical Formula 3' wherein, *' represents a linking point with the terminal end of the organic chromophore compound, and wherein the compatibilizer polymer comprises a structural unit with a sidechain represented by Chemical Formula 3:

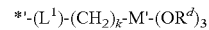   Chemical Formula 3 wherein, in each of Chemical Formula 3 and Chemical Formula 3',
$L^1$ is independently a single bond, —(C═O)O—, —O—, —S—, —SO₂—, —NR$^e$—, —(C═O)NR$^g$—, —O(C═O)NR$^h$—, wherein R$^e$, R$^g$, and R$^h$ are independently hydrogen, a substituted or unsubstituted C1 to C30 alkyl group, a substituted or unsubstituted C3 to C30 cycloalkyl group, or a substituted or unsubstituted C6 to C30 aryl group, or a combination thereof,
M' is independently Si, Ti, Al, Elf, Sn, Zr, Ga, or Ge,
R$^d$ is independently hydrogen, a substituted or unsubstituted C1 to C30 alkyl group, a substituted or unsubstituted C2 to C30 alkenyl group, or a substituted or unsubstituted C2 to C30 alkynyl group, having at least one double bond or triple bond, respectively, a substituted or unsubstituted C3 to C30 cycloalkyl group, or a substituted or unsubstituted C6 to C30 aryl group,
k is an integer of 0 to 30, and
* represents a linking point with the side chain of the compatibilizer polymer, and
wherein the precursor of the inorganic material polymer and the compatibilizer polymer in the composition are present in a mole ratio of about 8:2 to 4:6.

2. The composition of claim 1, wherein the organic chromophore compound comprises at least one chromophore functional group represented by Chemical Formulas 1-1 to 1-8:
Formula 1-1
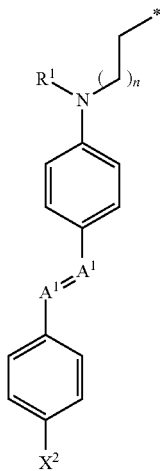
Formula 1-2
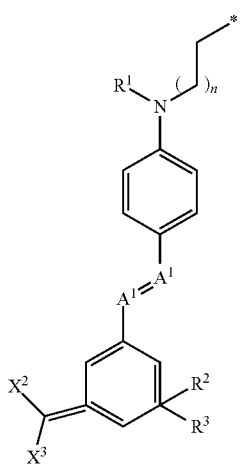
Formula 1-3
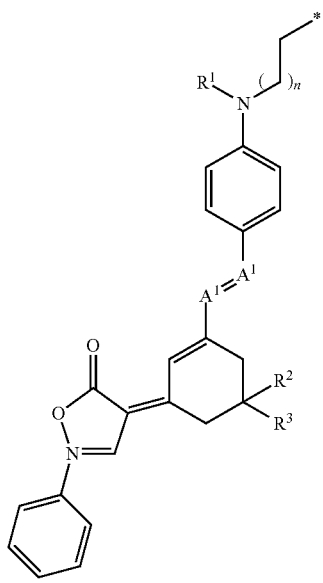
Formula 1-4
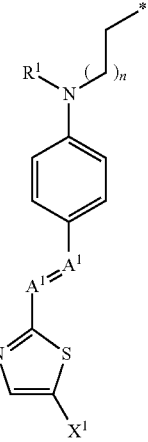
Formula 1-5
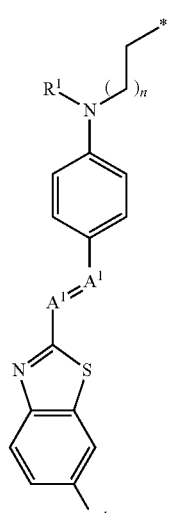
Formula 1-6
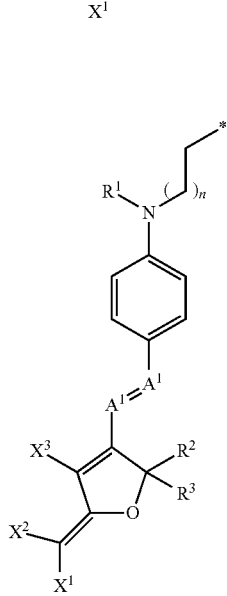

Formula 1-7

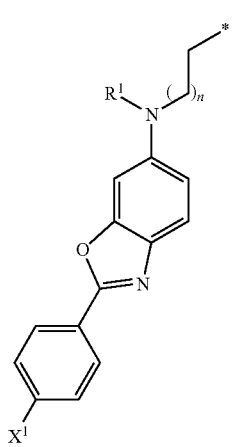

Formula 1-8

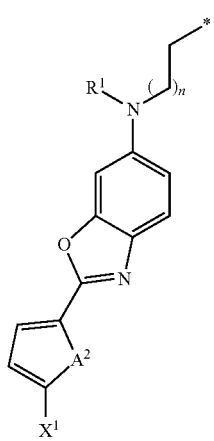

wherein, in Chemical Formulas 1-1 to 1-8,
$R^1$, $R^2$, and $R^3$ are independently hydrogen, a substituted or unsubstituted C1 to C10 alkyl group, a substituted or unsubstituted C3 to C10 cycloalkyl group, a substituted or unsubstituted C6 to C30 aryl group, or a combination thereof,
$A^1$ is independently CH or N,
$X^1$, $X^2$, and $X^3$ are independently —$NO_2$, —CN, —C(CN)=C($CN_2$), R—(C=O)O— (wherein R is a substituted or unsubstituted C1 to C10 alkyl group, or a substituted or unsubstituted C6 to C30 aryl group), a halogen element, a haloalkyl group, or a C1 to C10 alkyl group that is unsubstituted or substituted with a sulfone group (—$SO_2$),
n is an integer from 1 to 11, and
* represents a linking point where the organic chromophore compound is linked to the functional group that can bind to both the inorganic material polymer and the compatibilizer polymer.

3. The composition of claim 2, wherein the organic chromophore compound is represented by at least one of Chemical Formulas 1-1, 1-4, and 1-5, and
in Chemical Formulas 1-1, 1-4, and 1-5, $X^1$ and $X^2$ are independently —$NO_2$, —CN, a halogen, a C1 to C10 haloalkyl group, or a C1 to C10 alkyl group that is unsubstituted or substituted with a sulfone group (—$SO_2$),
$A^1$ is N, and $R^1$ is a substituted or unsubstituted C1 to C10 alkyl group.

4. The composition of claim 1, wherein the precursor of the inorganic material polymer is represented by Chemical Formula 2:

$$(R^a)_m(R^b)_n(R^c)_l\text{-M-}(OR^d)_{4-m-n-l} \quad \text{Chemical Formula 2}$$

wherein, in Chemical Formula 2,
$R^a$, $R^b$, $R^c$, and $R^d$ are independently hydrogen, a substituted or unsubstituted C1 to C30 alkyl group, a substituted or unsubstituted C2 to C30 alkenyl group, or a substituted or unsubstituted C2 to C30 alkynyl group having at least one double bond or triple bond, respectively, a substituted or unsubstituted C3 to C30 cycloalkyl group, or a substituted or unsubstituted C6 to C30 aryl group,
m, n, and l are independently an integer of 0 or 1, provided that 0≤m+n+l≤2, and
M is Si, Ti, Al, Hf, Sn, Zr, Ga, Ge, In, or Sb.

5. The composition of claim 4, wherein M of Chemical Formula 2 is Si, Ti, or Al, and 0≤m+n+l≤1.

6. The composition of claim 1, wherein the compatibilizer polymer further comprises structural units of poly(meth)acrylate, polyvinyl, polyalcohol, polyimide, polyamide, polyester, polyurethane, or a combination thereof.

7. The composition of claim 6, wherein the structural unit with a sidechain represented by Chemical Formula 3 of the compatibilizer polymer is present in an amount of less than or equal to about 50 mole percent based on the total moles of all structural units of the compatibilizer polymer.

8. The composition of claim 1, wherein the compatibilizer polymer comprises a structural unit represented by Chemical Formula 4-1 and a structural unit represented by Chemical Formula 4-2:

Chemical Formula 4-1

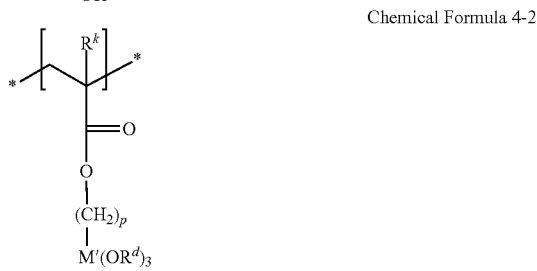

Chemical Formula 4-2 wherein, in Chemical Formulae 4-1 and 4-2,
$R^d$, $R^i$, $R^j$, and $R^k$ are independently hydrogen, a substituted or unsubstituted C1 to C30 alkyl group, a substituted or unsubstituted C2 to C30 alkenyl group, or a substituted or unsubstituted C2 to C30 alkynyl group, having at least one double bond or triple bond, respectively, a substituted or unsubstituted C3 to C30 cycloalkyl group, or a substituted or unsubstituted C6 to C30 aryl group,
M' is Si, Ti, Al, Hf, Sn, Zr, Ga, or Ge,
p is an integer of 0 to 10, and
* represents a linking point with an adjacent structural unit.

9. The composition of claim 1, wherein the functional group represented by Chemical Formula 3' is represented by Chemical Formula 5:

$$*'\text{-O(C=O)NR}^1\text{—(CH}_2)_k\text{-M'-(OR}^d)_3 \quad \text{Chemical Formula 5}$$

wherein, in Chemical Formula 5,
$R^1$ is hydrogen, a substituted or unsubstituted C1 to C30 alkyl group, a substituted or unsubstituted C3 to C30 cycloalkyl group, or a substituted or unsubstituted C6 to C30 aryl group,
M' is Si, Ti, or Al,
$R^d$ is a substituted or unsubstituted C1 to C10 alkyl group,
k is an integer of 1 to 10.

10. The composition of claim 1, wherein the organic chromophore compound is included in an amount of less than or equal to about 30 weight percent based on a total weight of the organic chromophore compound, the precursor of the inorganic material polymer, and the compatibilizer polymer.

11. The composition of claim 1, wherein the organic chromophore compound is included in an amount of greater than or equal to about weight percent and less than or equal to about weight percent based on a total weight of the organic chromophore compound, the precursor of the inorganic material polymer, and the compatibilizer polymer.

12. The composition of claim 1, further comprising a solvent.

13. A method of preparing a nonlinear optic material, comprising
preparing a composition comprising (i) an organic chromophore compound comprising a functional group represented by Chemical Formula 3' at a terminal end, and which can be polarized by an electric field, (ii) a precursor that forms an inorganic material polymer by a sol-gel reaction, and (iii) a compatibilizer polymer comprising a functional group represented by Chemical Formula 3 in the side chain:
Chemical Formula 3 and Chemical Formula 3' are independently represented by $$*\text{-(L}^1)\text{-(CH}_2)_k\text{-M'-(OR}^d)^3$$

wherein,
$L^1$ is a single bond, —(C=O)O—, —O—, —S—, —SO$_2$—, —NR$^e$—, —(C=O)NR$^g$—, —O(C=O) NR$^h$— (wherein R$^e$, R$^g$, and R$^h$ are independently hydrogen, a substituted or unsubstituted C1 to C30 alkyl group, a substituted or unsubstituted C3 to C30 cycloalkyl group, or a substituted or unsubstituted C6 to C30 aryl group), or a combination thereof,
M' is Si, Ti, Al, Hf, Sn, Zr, Ga, or Ge,
$R^d$ is hydrogen, a substituted or unsubstituted C1 to C30 alkyl group, a substituted or unsubstituted C2 to C30 alkenyl group, or a substituted or unsubstituted C2 to C30 alkynyl group, having at least one double bond or triple bond, respectively, a substituted or unsubstituted C3 to C30 cycloalkyl group, or a substituted or unsubstituted C6 to C30 aryl group,
k is an integer of 0 to 30, and
* represents a linking point with the terminal end of the organic chromophore compound, or the side chain of the compatibilizer polymer;
wherein the precursor of the inorganic material polymer and the compatibilizer polymer in the composition are present in a mole ratio of about 8:2 to 4:6;
applying the composition to a substrate to form a coating; and
heating the coating such that the precursor of the inorganic material polymer forms a polymer by a sol-gel reaction.

14. The method of claim 13, wherein the method of preparing the nonlinear optic material does not comprise a poling process after forming the polymer by the sol-gel reaction.

15. The method of claim 13, wherein the precursor of the inorganic material polymer is represented by Chemical Formula 2:

$$(R^a)_m(R^b)_n(R^c)_l\text{-M-(OR}^d)_{4-m-n-l} \quad \text{Chemical Formula 2}$$

wherein, in Chemical Formula 2,
$R^a$, $R^b$, $R^c$, and $R^d$ are independently hydrogen, a substituted or unsubstituted C1 to C30 alkyl group, a substituted or unsubstituted C2 to C30 alkenyl group, or a substituted or unsubstituted C2 to C30 alkynyl group having at least one double bond or triple bond, respectively, a substituted or unsubstituted C3 to C30 cycloalkyl group, or a substituted or unsubstituted C6 to C30 aryl group,
m, n, and l are independently an integer of 0 or 1, and 0≤m+n+l≤2, and
M is Si, Ti, Al, Hf, Sn, Zr, Ga, Ge, In, or Sb.

16. The method of claim 13, wherein the organic chromophore compound comprises at least one of chromophore functional groups represented by Chemical Formulas 1-1 to 1-8:

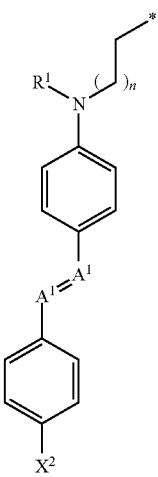

Formula 1-1

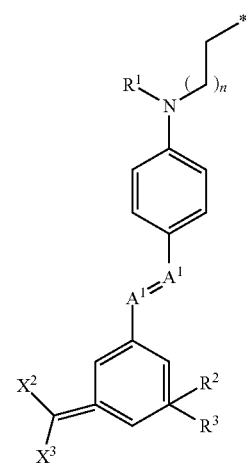

Formula 1-2

-continued

Formula 1-3

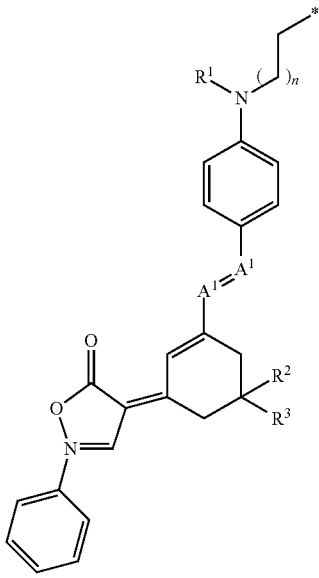

Formula 1-4

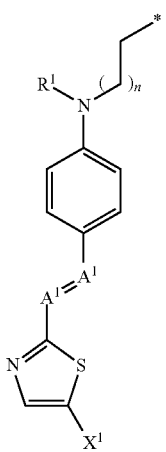

Formula 1-5

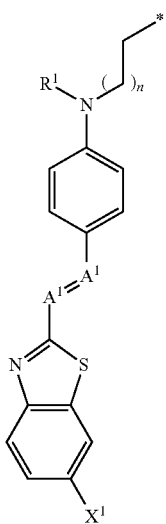

Formula 1-6

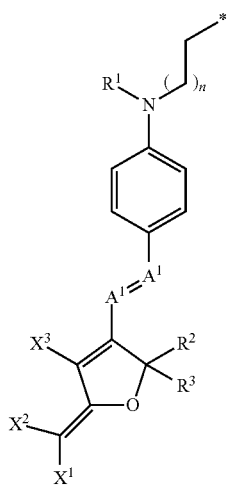

Formula 1-7

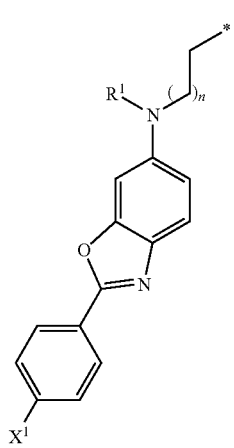

Formula 1-8

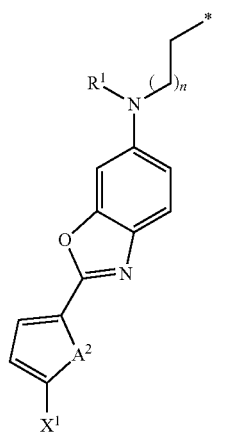

wherein, in Chemical Formulas 1-1 to 1-8, $R^1$, $R^2$, and $R^3$ are independently hydrogen, a substituted or unsubstituted C1 to C10 alkyl group, a substituted or unsubstituted C3 to C10 cycloalkyl group, a substituted or unsubstituted C6 to C30 aryl group, or a combination thereof, $A^1$ is independently CH or N, $X^1$, $X^2$, and $X^3$ are independently —$NO_2$, —CN, —C(CN)=C($CN_2$), R—(C=O)O— (wherein R is a substituted or unsubstituted C1 to C10 alkyl group, or a substituted or unsubstituted C6 to C30 aryl group), a halogen element, a haloalkyl group, or a C1 to C10 alkyl group that is unsubstituted or substituted with a sulfone group ($-SO_2$), n is an integer from 1 to 11, and

* represents a linking point with the functional group represented by Chemical Formula 3.

17. A nonlinear optic material prepared from the composition of claim 1, wherein the nonlinear optic material has a $r_{33}$ value of about 50 pm/V to about 70 pm/V.

* * * * *